US009342935B2

(12) United States Patent
Lundsgaard et al.

(10) Patent No.: US 9,342,935 B2
(45) Date of Patent: May 17, 2016

(54) SMARTPHONE BASED SYSTEM FOR VEHICLE MONITORING SECURITY

(71) Applicants: Soren K. Lundsgaard, Inverness, IL (US); John K. Hefferan, Hoffman Estates, IL (US); Niels C. Lundsgaard, Raleigh, NC (US)

(72) Inventors: Soren K. Lundsgaard, Inverness, IL (US); John K. Hefferan, Hoffman Estates, IL (US); Niels C. Lundsgaard, Raleigh, NC (US)

(73) Assignee: Diamond 18 Ltd., Inverness, IL (US)

(*) Notice: Subject to any disclaimer, the term of this patent is extended or adjusted under 35 U.S.C. 154(b) by 0 days.

(21) Appl. No.: 14/147,419

(22) Filed: Jan. 3, 2014

(65) Prior Publication Data

US 2014/0195100 A1 Jul. 10, 2014

Related U.S. Application Data

(60) Provisional application No. 61/848,468, filed on Jan. 4, 2013.

(51) Int. Cl.

| | |
|---|---|
| ***G01M 17/00*** | (2006.01) |
| ***G07C 5/08*** | (2006.01) |
| ***G07C 5/00*** | (2006.01) |
| ***G06Q 50/30*** | (2012.01) |
| *G08G 1/00* | (2006.01) |

(52) U.S. Cl.

CPC .............. *G07C 5/0841* (2013.01); *G06Q 50/30* (2013.01); *G07C 5/008* (2013.01); *G07C 2205/02* (2013.01); *G08G 1/20* (2013.01)

(58) Field of Classification Search

CPC .. G07C 5/0841; G07C 5/008; G07C 2205/02; G06Q 50/30; G08G 1/20

See application file for complete search history.

(56) References Cited

U.S. PATENT DOCUMENTS

| | | | | |
|---|---|---|---|---|
| 5,797,134 | A | 8/1998 | McMillan et al. | |
| 8,090,598 | B2 | 1/2012 | Bauer et al. | |
| 8,214,100 | B2 | 7/2012 | Lowrey et al. | |
| 8,595,034 | B2 | 11/2013 | Bauer et al. | |
| 8,935,036 | B1 * | 1/2015 | Christensen | G07C 5/008 701/29.1 |
| 2005/0203683 | A1 * | 9/2005 | Olsen | B60R 25/1004 701/29.3 |
| 2005/0285782 | A1 * | 12/2005 | Bennett | 342/357.07 |

(Continued)

OTHER PUBLICATIONS

C. Boucher, et al., "ITRS, PZ-90 and WGS 84: Current Realizations and the Related Transformation Parameters", "Journal of Geodesy", 2001, pp. 613-619, vol. 75.

(Continued)

*Primary Examiner* — Calvin Cheung
(74) *Attorney, Agent, or Firm* — Charles A. Lemaire; Lemaire Patent Law Firm, P.L.L.C.

(57) ABSTRACT

An apparatus and method for monitoring a vehicle. Some embodiments include: capturing and securely storing OBD and location data from the vehicle, maintaining the data on storage in control of a user for a user-specified amount of time, securely transmitting the stored data to an internet-based server, storing the data on the internet server and processing the data for retrieval, retrieving the data from the internet server for display via a web server or specialized application, and performing remote diagnostics in the vehicle based on the VIN. Some embodiments include extracting a make and model of the vehicle from the VIN; wirelessly transmitting the make and model to a server; wirelessly receiving, from the server, a particular set of on-board-diagnostic (OBD) queries to perform to determine whether any abnormal measurements exist for this make and model; and executing a plurality of queries from the particular set of OBD queries.

19 Claims, 20 Drawing Sheets

(56) References Cited

U.S. PATENT DOCUMENTS

| | | | | |
|---|---|---|---|---|
| 2007/0109104 | A1* | 5/2007 | Altan | B60Q 9/008 340/407.1 |
| 2007/0161355 | A1* | 7/2007 | Zeng | 455/99 |
| 2009/0170537 | A1* | 7/2009 | Mauti, Jr. | 455/466 |
| 2010/0292892 | A1* | 11/2010 | Enomoto | G07C 5/008 701/33.4 |
| 2011/0191581 | A1* | 8/2011 | Shim et al. | 713/158 |
| 2012/0197486 | A1* | 8/2012 | Elliott | 701/33.2 |
| 2013/0046592 | A1* | 2/2013 | Ross | G06F 3/048 705/14.4 |
| 2015/0116100 | A1* | 4/2015 | Yang | G07C 9/00119 340/426.19 |
| 2015/0312380 | A1* | 10/2015 | Sauerbrey | H04L 69/08 455/426.1 |

OTHER PUBLICATIONS

Bayen,et al., "Mobile Millennium: GPS Mobile Phones as Traffic Probes,California Networked Traveler—Safe Trip 21 Phase II", "Downloaded from: http://www.dot.ca.gov/newtech/researchreports/reports/2011/task_1930-tsm.pdf", Sep. 2011, Pubiisher: California Department of Transportation, Division of Research arid Innovation, MS-83.

Hoh, et al., "Virtual Trip Lines for Distributed Privacy-Preserving Traffic Monitoring", "MobiSys '08 Proceedings of the 6th international conference on Mobile systems, applications, and services", Jun. 17-20, 2008, pp. 15-28.

* cited by examiner

SMARTPHONE BASED SYSTEM FOR VEHICLE MONITORING SECURITY

CROSS-REFERENCE TO RELATED APPLICATIONS

This application claims priority benefit, under 35 U.S.C. §119(e), of U.S. Provisional Patent Application No. 61/848,468, filed Jan. 4, 2013, which is incorporated herein by reference in its entirety.

FIELD OF THE INVENTION

The present invention relates to the field of secured computer telecommunications and more particularly to an apparatus and method for an Internet-based server system to monitor, aggregate and compare a vehicle's performance relative, for example, to other similar vehicles, to other vehicles in a particular or similar geographic location, to vehicles in similar weather conditions, or the like, while maintaining individual privacy and security.

BRIEF SUMMARY OF THE INVENTION

On-board diagnostics (OBD) systems have been integrated into almost all modern vehicles (automobiles, trucks and the like. OBD systems in a vehicle monitor sensors and perform self-diagnostic activities, and store the results (for example, as diagnostic trouble codes (DTCs)) for later reporting. Modern OBD systems use a standardized digital communications port and can output a standardized set of diagnostic trouble codes and real-time data. The European Union and the United States government have set standards for DTCs as well as signaling standards.

OBD-II is a standard that specifies the electrical connector, and pinout and electrical signaling protocols for communications. OBD-II also specifies which parameters must be monitored and how to encode the data from the monitored parameters.

Every vehicle includes a unique vehicle identification number (VIN) that associates the particular vehicle with a model, date of manufacture, manufacturer, and other similar information.

Many people have a heightened concern for privacy and security as to themselves, their location, and their data. People would also benefit from having access to data regarding their own vehicle, as well as reference data indicative of other vehicles to which they can compare the data about their own vehicle.

U.S. Pat. No. 8,214,100 to Lowrey, et al. issued Jul. 3, 2012 titled "Internet-based system for monitoring vehicles," and is incorporated herein by reference. Lowrey, et al. describe a method for monitoring a vehicle by: 1) generating a data packet including vehicle data retrieved from the vehicle using a wireless appliance; 2) transmitting the data packet over an airlink with the wireless appliance so that the data packet passes through a network and to a host computer system; 3) processing the data packet with the host computer system to generate a set of data; and 4) displaying the set of data on a web page hosted on the internet.

There exists a need in the art for an apparatus and method for monitoring, storing, aggregating and comparing a vehicle's performance relative, for example, to other similar vehicles, while maintaining security and privacy for the users and their data.

SUMMARY OF THE INVENTION

The present invention provides an apparatus and method for monitoring a vehicle. Some embodiments include: 1) capturing and securely storing data retrieved from the vehicle as well as location information, 2) maintaining the data on a storage device in control of a user for a user-specified amount of time, 3) securely transmitting the stored data over a wireless (or optionally, a wired) connection over the internet to an internet-based server, 4) storing the data on the internet server and processing the data for retrieval, 5) retrieving the data from the internet server for display via a web server or specialized application, and 6) performing remote diagnostics in the vehicle based on the VIN. Some embodiments include extracting a make and model (in some embodiments, the model information includes the model year and/or date of manufacture; in some embodiments, the extracted information allows the server 140 (see FIG. 1) to derive or look up the model year and/or date of manufacture) of the vehicle from the VIN; wirelessly transmitting the make and model to a server; wirelessly receiving, from the server, a particular set of on-board-diagnostic (OBD) queries to perform to determine whether any abnormal measurements exist for this make and model; and executing a plurality of queries from the particular set of OBD queries.

While "telematics" refers generally to the gathering of data automatically and transmitting the gathered data over long distances, the present invention is concerned with gathering vehicle data from a vehicle's GPS and/or OBD system and transmitting the data to a central server, where the data is analyzed and aggregated so that personally identifiable data of a person is not available to anyone other than that person. The present invention satisfies a user's desire for privacy when capturing telematics information in automobiles, while providing access to telematics data from a large number of vehicles and drivers that is aggregated in a central location. The aggregated information is then filtered, sorted, and analyzed by the vehicle owners, or third parties.

Vehicle telematics systems can capture a range of information about vehicles including (for example) speed, engine revolutions per minute (RPM), and fuel consumption. Associating this information with a specific road and a specific vehicle or vehicles with similar characteristics would be advantageous to a number of parties, including vehicle owners, vehicle manufacturers, and public safety officials. Telematics systems can also determine service needs of vehicles, based on the status of onboard systems on the vehicle. Vehicle owners can take advantage of access to this telematics data to proactively avoid serious, expensive, and possibly disruptive problems with their vehicles by looking for indicators of potential problems and resolving those problems before they cause extensive damage.

At the same time, owners and drivers of private vehicles may be resistant to allowing a third party to have access to real time data about their vehicle and driving habits. The present invention addresses these competing needs with a system and methods to improve privacy of telematics data. The information that a user would like to keep private (that is, available to the user, but not available to others if the data includes identifiable name, address, geographic location or characteristics of the user) are: 1) the current functioning of the vehicle, including performance parameters of the systems on the vehicle, while receiving warnings if the vehicle operating parameters indicate (potential) problems with the vehicle, 2) the current location of the user and their vehicle and general operating information about the vehicle at the current time, 3) the content of the data when being transmitted from the user to the aggregating site facility, 4) the disclosure of information that uniquely identifies the vehicle or driver in data when in transit to or when stored on the aggregating site, and 5) the start and endpoints of vehicle journeys to a low level of accuracy. In addition, users would like 6) the ability to quickly and securely destroy any stored data while the data is waiting to be uploaded to the aggregating site.

U.S. Pat. No. 8,214,100 to Lowry et al. describes monitoring telematics data in a vehicle, but it does not teach any methods for storing and delaying transmission, securing, destroying, or making anonymous the telematics data collected from a vehicle.

In some embodiments, the present invention provides a vehicle computer device, located in a vehicle, and configured to perform a method. The method includes: acquiring, into a in-vehicle computer, vehicle data that includes vehicle-diagnostic data, time data, and location data associated with a route that a particular vehicle travels; associating the vehicle-diagnostic data with the time data and the location data; securing the vehicle data while stored on the in-vehicle computer; processing said vehicle data according to a mathematical algorithm to generate derived diagnostic and location information that is at least in part derived from the acquired vehicle-diagnostic data, time data, and location data, and wherein the derived information has a meaning distinct from the acquired vehicle data; formatting the derived diagnostic information for display on an application running on a host computer device, wherein the application can provide an interface for presenting information associated with the vehicle, wherein the interface includes at least one of an icon and a data field associated with derived information indicative of the vehicle's engine performance; and wirelessly transmitting said formatted vehicle data in a communication to host computer device.

In some embodiments, the present invention provides an anonymized data-collection method for monitoring a vehicle with a vehicle computer device located in the vehicle. This second method includes: (a) determining the VIN of the vehicle; (b) changing the VIN to make the particular vehicle anonymous while retaining information in the VIN which identifies the make and model of the vehicle; (c) wirelessly transmitting to a host computer the anonymous VIN of the said vehicle; and (d) wirelessly receiving from a host computer a table of OBD queries to determine if any abnormal measurements exist for this particular make and model of vehicle.

In some embodiments, the present invention provides a vehicle computer device configured to be located in a vehicle. The vehicle computer device is also configured to (a) acquire vehicle data comprising numerical diagnostic data, time data, and location data associated with the route the vehicle travels; (b) associate the numerical diagnostic data with the time data and the location data; (c) secure the vehicle data while stored on the in-vehicle computer; (d) process the vehicle data according to a mathematical algorithm to generate derived diagnostic and location information that is, at least in part, derived from the acquired vehicle diagnostic data, time data, and location data, and wherein the derived information has a meaning distinct from the acquired vehicle data; (e) format the derived diagnostic or location information for display from an application running on a host computer device, wherein the application provides an interface for presenting information associated with the vehicle, wherein the interface includes at least one of an icon and a data field associated with derived information indicative of the vehicle's engine performance; and (f) wirelessly transmit the formatted vehicle data in a communication to host computer device.

In some embodiments, the present invention provides a computerized method for monitoring a particular vehicle with a vehicle computer system located in the vehicle, the monitoring method including: acquiring a set of vehicle data that includes vehicle diagnostic data, time data, and location data associated with a route the vehicle travels; associating each of a plurality of the diagnostic data with respective ones of the time data and the location data; securing the set of vehicle data and then storing the secured set of vehicle on the vehicle computer system; and after a predetermined time delay from the acquiring of the set of vehicle data has elapsed, wirelessly transmitting the set of vehicle data to a host computer server.

In some embodiments, the present invention provides a data structure for organizing a set of vehicle data regarding a particular vehicle, wherein the set of vehicle data includes vehicle diagnostic data, time data, and location data associated with a route the particular vehicle travels. This data structure includes vehicle information derived from the particular vehicle's vehicle identification number (VIN); and a plurality of interval subsets, each interval subset associated with a particular interval of travel, and each interval subset including: data indicative of a start location for the particular interval, data indicative of an end location for the particular interval, data indicative of a start time for the particular interval, data indicative of an end time for the particular interval, data indicative of minima and maxima of a plurality of vehicle diagnostic data associated with the particular vehicle between the start location and the end location for the particular interval, and averages and deciles of a plurality of statistical measures of vehicle diagnostic data associated with the particular vehicle between the start location and the end location for the particular interval.

DETAILED DESCRIPTION OF THE INVENTION

Although the following detailed description contains many specifics for the purpose of illustration, a person of ordinary skill in the art will appreciate that many variations and alterations to the following details are within the scope of the invention. Very narrow and specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As used herein, global-position system (GPS) is a general term which includes GPS, A-GPS, Galileo, Compass (China), GLONASS, Loran, E911 techniques, and other methods for determining location on earth to sufficient accuracy (generally 10 m or less). In some embodiments, the present invention provides transmission of data via cellular modem, while in other embodiments, this transmission is performed via satellite modem, wired connection, universal-serial bus (USB) card or disk, secure digital (SD) card, Bluetooth®, or wireless local-area network (LAN) such as defined in an 802.11 standard or the like.

In some embodiments, the present invention uses location data that specifies latitude and longitude as set forth in the World Geodetic System 1984 (WGS-84) standard as measurements to specify a location on the surface of the earth. In other embodiments, other similar or equivalent measurement systems are used, such as earlier WGS standards, the International Terrestrial Reference System (ITRS), the United States Nation Grid, the Military grid reference system, PZ-90 (the terrestrial reference system used by the Russian GLONASS system), and others.

Figure 1:
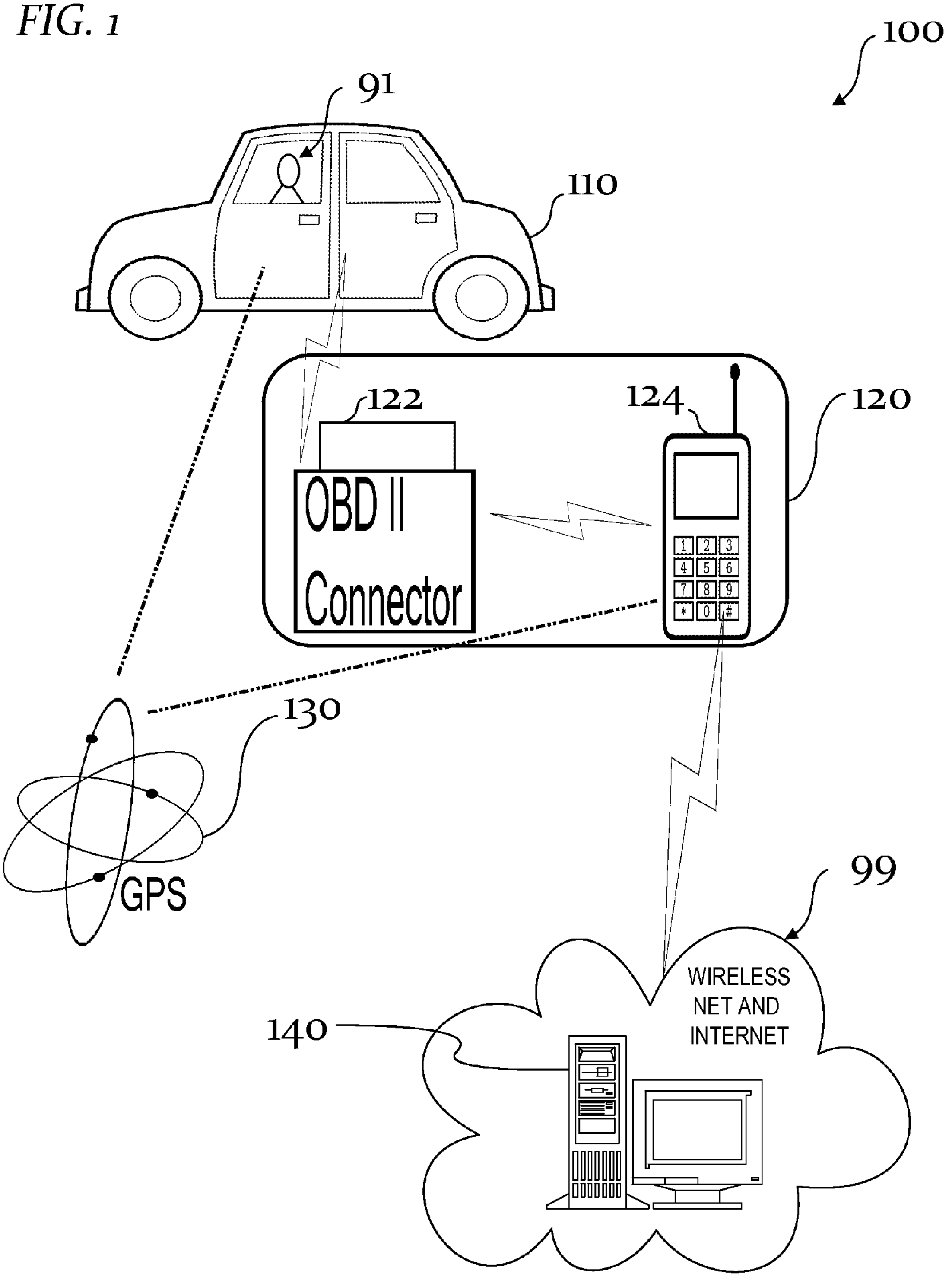
FIG. 1 is a schematic drawing of system 100 that shows the architectural elements of the invention, according to some embodiments.

FIG. 1 is a schematic drawing of system 100 that shows the architectural elements of the invention, according to some embodiments. In some embodiments, the first element is a vehicle 110 with an onboard monitoring system and connector to that system such as the OBD II port. The second element is hardware 120 which includes two parts. In some embodiments, the first part is a physical connection to the OBD II port 122 on the vehicle, and the second part is the storage and communication device 124, such as a smartphone (generally herein storage and communication device 124 will be referred to as smartphone 124, however in other embodiments of each instance, a tablet computer, laptop computer, or the like will substitute for, or supplement, a smartphone for device 124), that is linked with the physical connection 122 (for example, via a wireless connection using 802.11 or Bluetooth® protocols, or via a wired connection such as a USB or serial cable, or via other suitable means), and which can communicate with the aggregating element 140 across a telecommunications medium 99 that includes wireless and/or internet links. In other embodiments, the on-board diagnostics system of the vehicle includes a wireless communications system that wirelessly communicates with storage and communication device 124 without using the OBD II port 122 on the vehicle. The next element of the invention is a location element 130 (e.g., a device or functionality) that can determine the location of the vehicle, such as a GPS unit. In some embodiments, the location element is included in the vehicle 110 or in the physical connection to the OBD port 122, while in other embodiments (and more typically), in the smartphone that is used as storage and communication device 124. The last element is the aggregating element 140 which communicates with the smartphone 124, and from which a user can query for aggregated information. Typically, aggregating element 140 is a server with a connection to the internet, with data-storage capability, with computation capability, and with web-server capability.

Privacy of Performance Parameters and Warning Messages.

In typical telematics applications, the telematics application sends performance data from the vehicle (passenger car or other passenger vehicle, or agricultural tractor, tractor trailer, railroad locomotive, private, commercial, or military airplane, naval vessel, or the like) to a central location for analysis. Users of private vehicles would like to enjoy the benefits of collecting and analyzing telematics information and using telematics functionality to determine whether there are (potential) problems with the vehicle, while not relinquishing anonymity or control of this information and while ensuring that appropriate privacy controls are in place.

Figure 2:
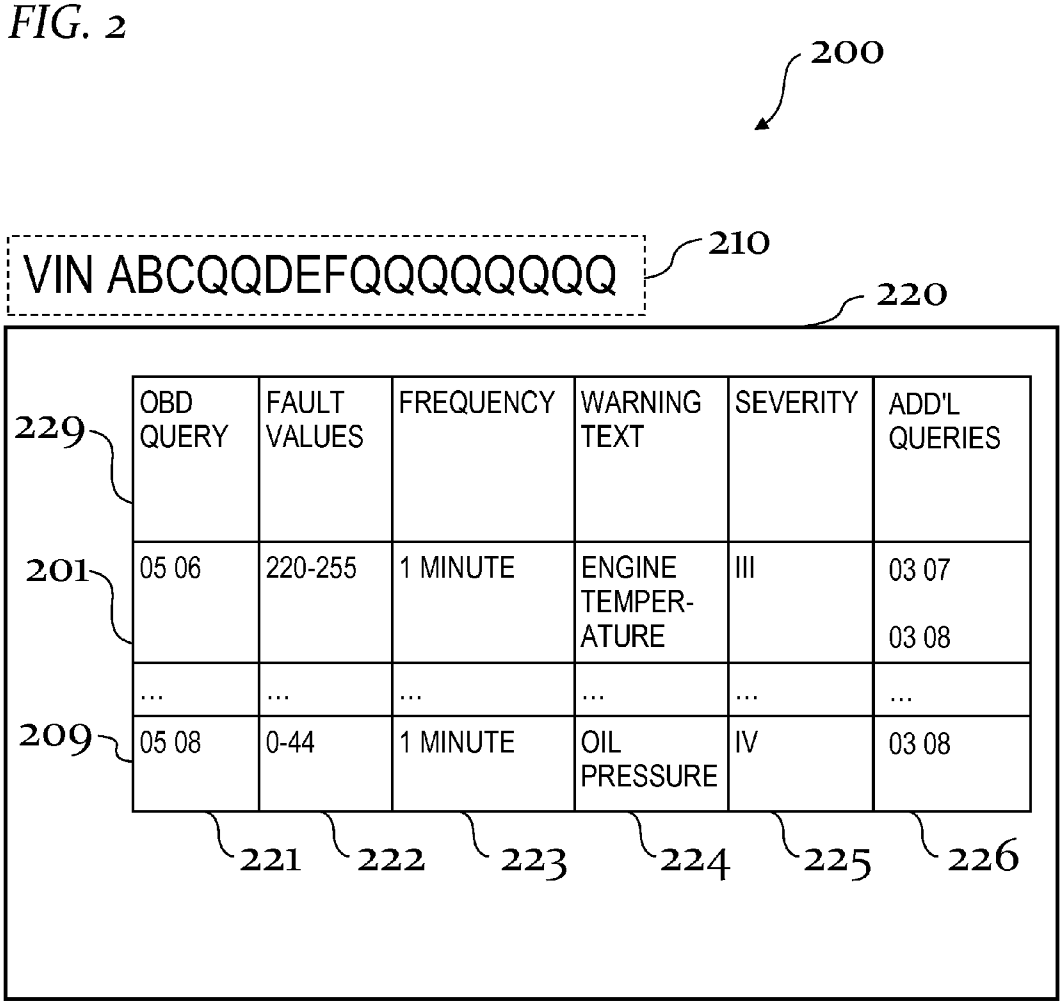
FIG. 2 shows a data structure 200 of an anonymized VIN and a table of queries and associated parameters for that anonymized VIN.
Figure 8A:
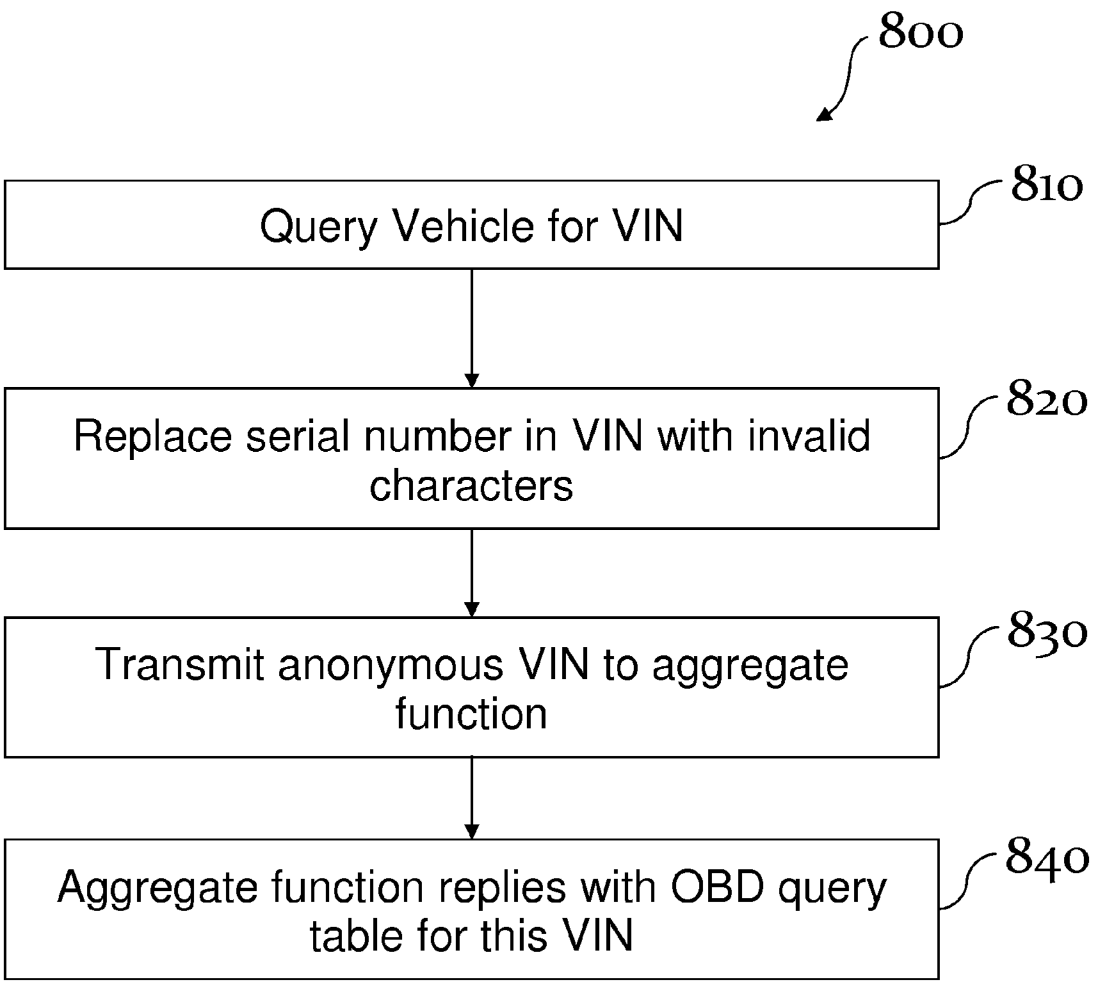
FIG. 8A is a flowchart of a method 800 of a method for making the VIN of a vehicle anonymous.

FIG. 2 shows a data structure 200 of an anonymized VIN and a table of queries and associated parameters for that anonymized VIN. Referring to FIG. 1, FIG. 2 and flowchart 800 of FIG. 8A, in some embodiments, when system 100 starts, it determines the vehicle identification number (VIN) of the vehicle (operation 810 in FIG. 8A) by sending a query from the smartphone 124 through the OBD connector 122 to the vehicle 110, which returns the VIN through the same path. The system then removes the check digit (based on world manufacturer identifier and model), and also removes the serial number from the VIN, operation 820. These removed fields are replaced with invalid values (for example the letter Q). This modified VIN is then sent via smartphone 124 to the aggregate element 140, operation 830. In some embodiments, the aggregate element contains one table 220 for each possible modified VIN 210 with a plurality of columns of categories 229 of parameters; in some embodiments, including the following columns: a) a query of an OBD code 221, b) a range of values 222 for the query which indicate some (potential) problem with the vehicle having that modified VIN, c) how often the query should run 223, d) information to be displayed, e.g., in some embodiments, a text description of the invalid result 224, and e) the severity of the invalid result 225. In some embodiments, severities may include I) information, II) warning—contact service station or dealership for future service, III) contact service station or dealership for service, drive below speed X, drive less than Y miles to get service, and IV) stop vehicle immediately in a safe location—continued operation will increase risk to driver and passengers, or will incur substantial (expensive) additional damage to vehicle (or both); contact authorities, request roadside assistance, or request tow truck. In some embodiments, the table 220 contains f) a column which indicates which additional queries should be requested and stored for later analysis when the query indicates a problem 226. This table for this specific modified VIN is then transmitted back to the smartphone and stored on the smartphone, in operation 840 of FIG. 8A. (Note that, in some embodiments, this communication may occur without encryption without reducing the privacy of the user, as the make and model of the vehicle is visible to outside observers.)

While the vehicle is in operation, the smartphone 124 cycles through the table executing each query to the vehicle 110 via the connection to the OBD port 122, at the rate given in the third column of the table 223. If the value returned by the vehicle to the query is in the range given in the second column of the table 222, the smartphone then alerts the driver of the vehicle via an on-screen message or audible alarm on the smartphone 124 the nature of the problem 224 and the severity 225. The smartphone 124 can then allow the user to request certain actions, ranging from ignoring the alarm, to making phone or text message calls, or arranging for service via the smartphone's numerous other interfaces. For example, the application may also (based on driver input and communication with the aggregation element) suggest one or more service stations in the proximity of the vehicle which have indicated that they are capable of servicing vehicles matching the make and model of this vehicle and prompt the user to use the smartphone to call the service station and to transmit data collected (as indicated by the last column of the table) 226 to the service station so that the service station can better assist the driver.

Figure 3:
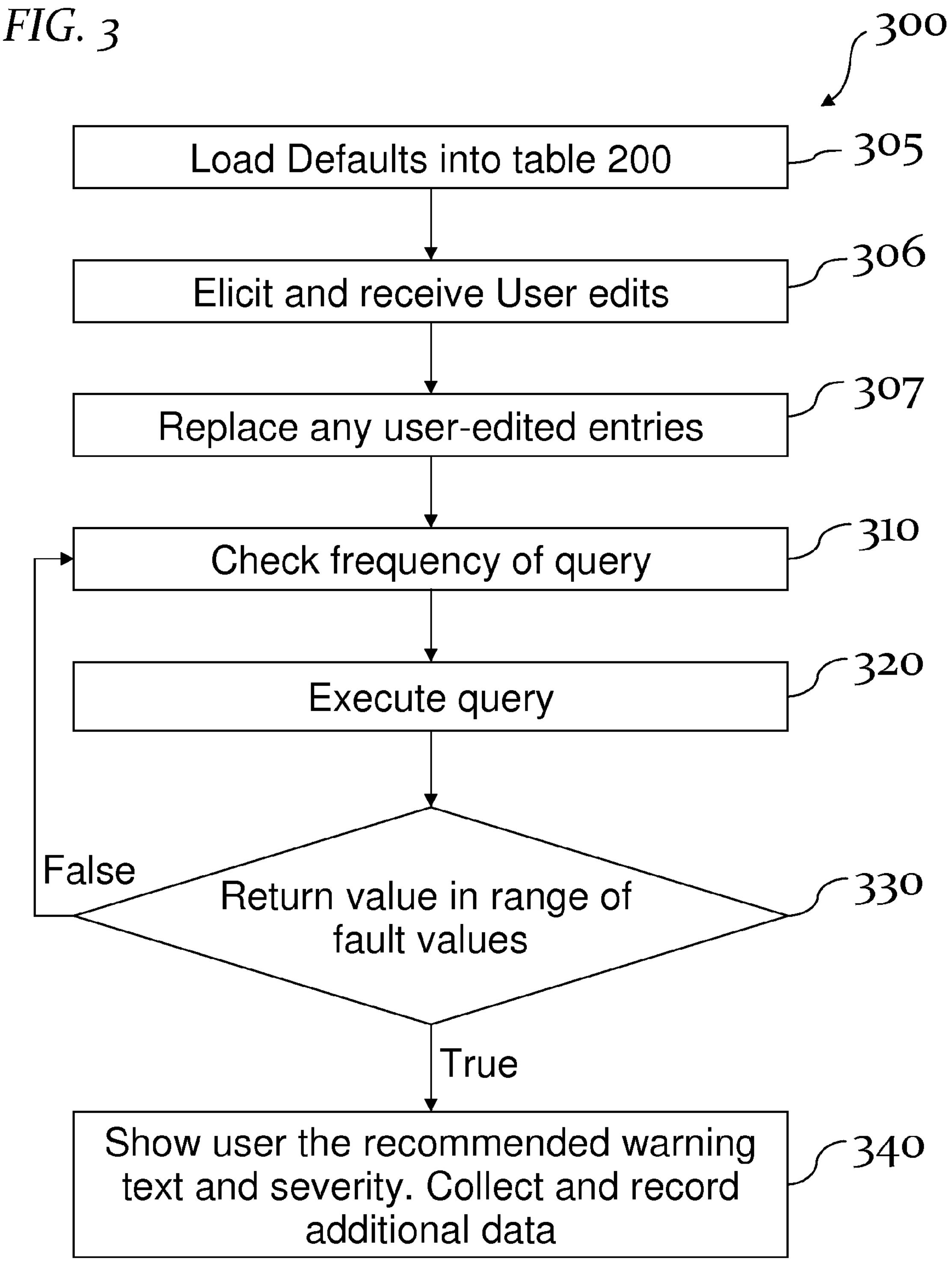
FIG. 3 is a flowchart of a method 300 showing how the entries of the tables are used to query for faults in a vehicle.

FIG. 3 is a flowchart of a method 300 showing how the entries of a table such as table 220 are used to query for faults in a vehicle. In some embodiments, method 300 includes the operations of populating 305 (into table 200) with a plurality of default control parameters (values in table 200 that will be used unless the user changes those values), eliciting and receiving 306 one or more user-selected replacement control-parameter values from a user 91, and updating 307 (into table 200) with the values received from the user 91. Operation 310 obtains a timing-control parameter (for example, at a time or frequency specified by parameter 223 of row 201) from table 200; operation 320 obtains a OBD-function-selection-control parameter (for example, query parameter 221 (and/or optionally other query parameters 226) of row 201 of table 200) and executes the selected OBD query or function specified by the OBD-function-selection-control parameter at the time or frequency specified by the timing-control parameter; operation 330 obtains OBD-reference-fault-comparison parameters (for example, fault-values range parameter 222 and compares the return-value results from to the selected OBD query to range specified by the OBD-reference-fault-comparison parameters; if the return results are within a range of fault values, operation 340 stores the return results, obtains warning information (for example, text and/or graphical data specified by parameter 224 of row 201 of table 200) and presents (via a visual display and/or audio) the information to user 91, in some embodiments, along with an indication of severity of the detected fault parameters and/or further results that are queried, received and/or processed based on the additional-query parameters 226 specified in row 201 of table 200. On the other hand, if the comparison performed by operation 330 on the return-value results returns FALSE (indicating the return-value results are not in the range of fault values, control is passed back to operation 310, which proceeds to the next row of table 200 and operations 310-340 of method 300 are repeated for each of the plurality of rows 201-209 of table 200, and this is repeated for the table 200 indefinitely (for example, as long as the vehicle is operating).

Keeping Current Location and General Telematic Data Private.

Figure 4:
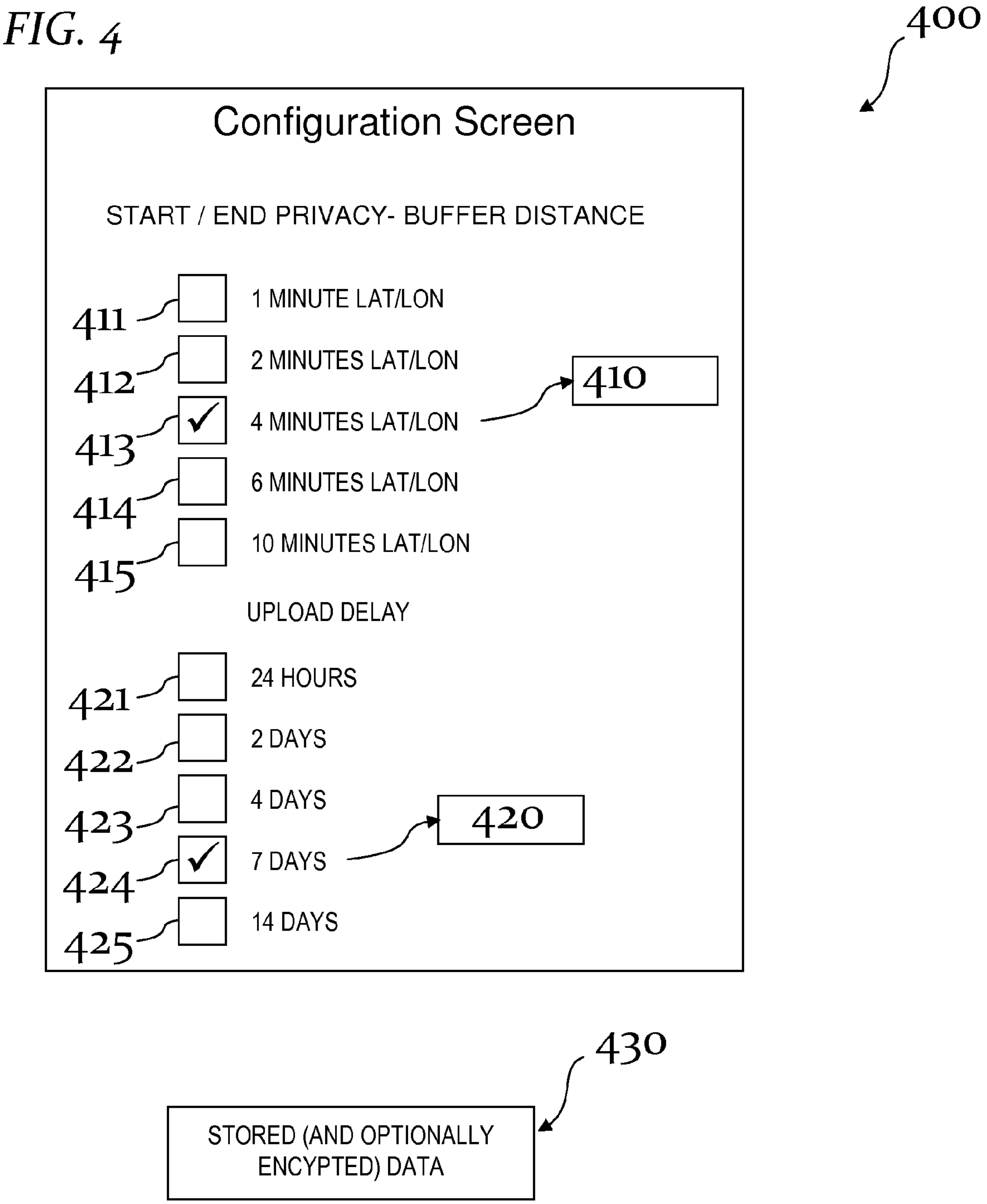
FIG. 4 is a diagram of an exemplary configuration menu 400 for the system showing options for the privacy buffer distance and the upload delay length of time.

FIG. 4 is a diagram of an exemplary configuration menu 400 for the system showing selection options 411, 412, 413, 414 and 415 for the parameters of privacy buffer distance 410 and options 421, 422, 423, 424 and 425 for the upload length-of-time delay 420. In some embodiments, the user 91 (FIG. 1) indicates a buffer distance (e.g., in this example, 4 minutes of latitude and longitude) that is used for parameter 410 to obscure that user's actual position by up to that distance when location data is reported, and an upload delay (e.g., in this example, 7 days) that is used for parameter 420. In some embodiments, different variable amounts of distance and upload delay, each more than zero but up to the specified parameters, are used for each upload in order to help the obscuration process.

Figure 5:
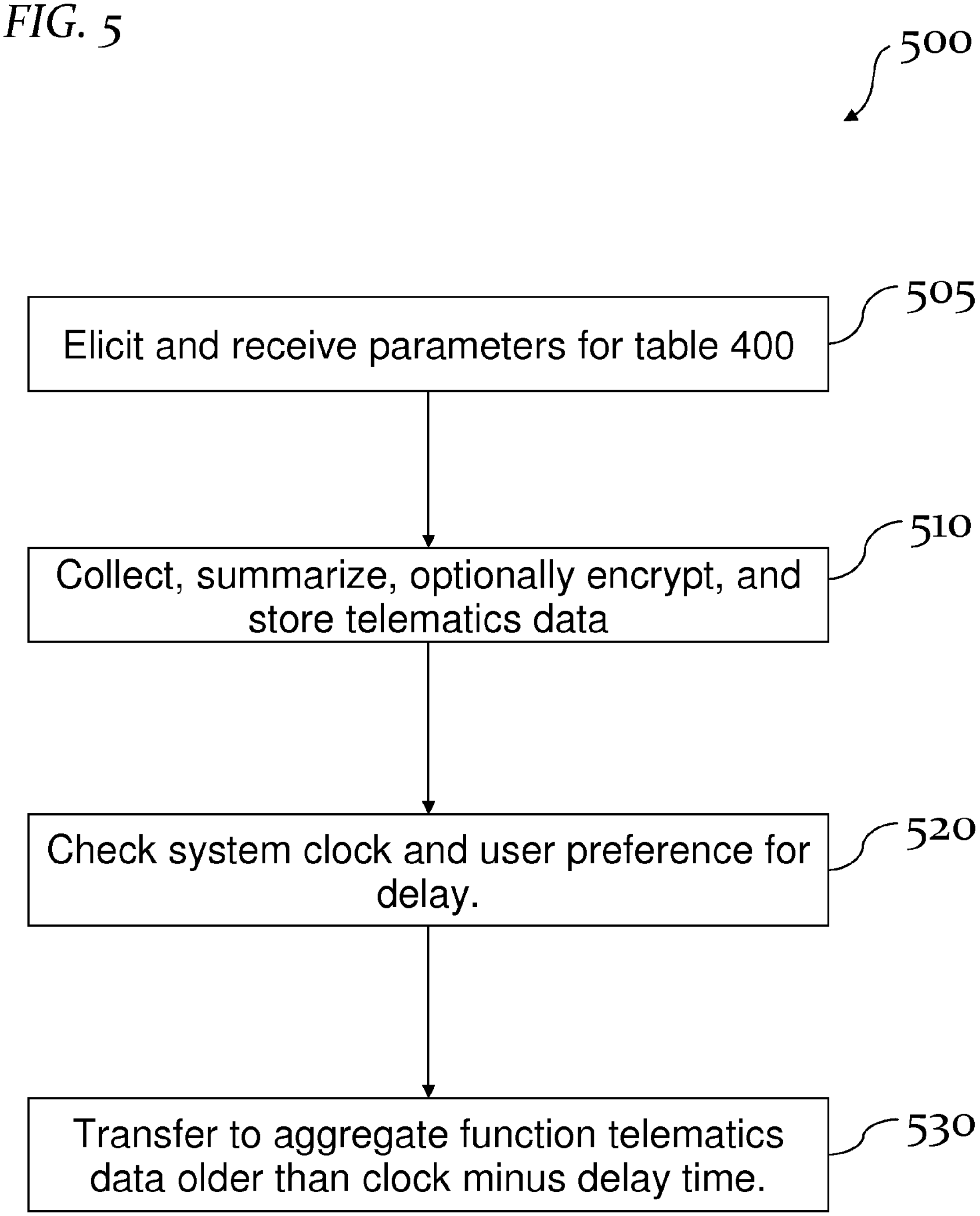
FIG. 5 is a flowchart of a method 500 of the method for collecting telematics data and determining when to send it to the aggregation function.

FIG. 5 is a flowchart of a method 500 for collecting telematics data and determining when to send it to the aggregation function. In some embodiments, the method 500 for ensuring privacy of the location and telematics data is as follows. In some embodiments, operation 505 of method 500 implements menu 400 and elicits and receives a plurality of parameters, for example data for privacy buffer distance 410 and upload delay 420, from user 91 so that the user 91 can configure the system 100 to specify a non-zero amount of time for which the data must be stored on the smartphone 124 before it is transmitted to the aggregating function 140 (for example 3 days, or 1 week in parameter 420 in FIG. 4). One aspect of ensuring privacy includes, using method 500, delaying, in operation 530, transmission of data to the aggregation element 140 until after the data has been stored on the phone for that amount of time, checked in operation 520. (Cellular phones typically have access to very accurate time, ensuring that this delay is respected.) In some embodiments, another aspect includes, in operation 510, encrypting the data before it is stored on the smartphone 124, so that any data stored in, or transmitted, by the smartphone 124 is already encrypted (which further protects against third-party programs that may reside in the smartphone 124 from getting access to or transmitting, without authorization, the obtained GPS and OBD data stored in the smartphone 124). In other embodiments, operation 530 encrypts the data with an alternative or supplemental additional encryption before transmitting the data. (Handling of encryption keys is discussed later, including a plurality of different strategies for keying based on the user's requirements.)

Privacy of Data when Transmitted from Smartphone to Aggregation Element.

In some embodiments, the method for ensuring privacy of telematics data when the data is transmitted from the smartphone to the aggregation element is to use public-key cryptography. The aggregation element 140 has a private key (which it keeps secure) and a public key (which is, or can be, widely known) which aggregation element 140 sends to the smartphone 124. In some embodiments, after the delay specified by parameter 420 (FIG. 4) of sending information has been reached, operation 520 and/or operation 530 of FIG. 5 includes using the smartphone to decrypt the data that was encrypted and stored on the smartphone by operation 510 and immediately to encrypt it using the aggregation element's public key. Note that this may also occur by replacing or appending the wrapper containing the internal symmetric key used to encrypt the data, and which is encrypted by the smartphone's key, with a wrapper of the internal symmetric key encrypted with the aggregation element's public key. In some embodiments, the OpenPGP standard RFC 4880 (a standard for the encryption used by the Pretty Good Protection software) provides this functionality. The smartphone 124 then transmits the encrypted data to the aggregation element 140 which decrypts the data with the aggregation element's private key.

In some embodiments, the aggregation element 140 keeps a private decryption key within itself, and sends a public encryption key Accordingly, in some embodiments, operation 510 executing in smartphone 120 uses the smartphone's private key (as an "inner encryption wrapper") to encrypt data stored in table 430 and operation 530 uses the aggregation element's public key (as an "outer encryption wrapper") to further encrypt the data in table 430, and operation 530 transmits this double-encrypted data to aggregation element 140. In some embodiments, aggregation element 140 the uses its private key to partially decrypt the received data (to remove the "outer encryption wrapper") to obtain the data having only the smartphone's private key encryption, and then uses the smartphone's public key to finish decrypting the data (to remove the "inner encryption wrapper").

Figure 6:
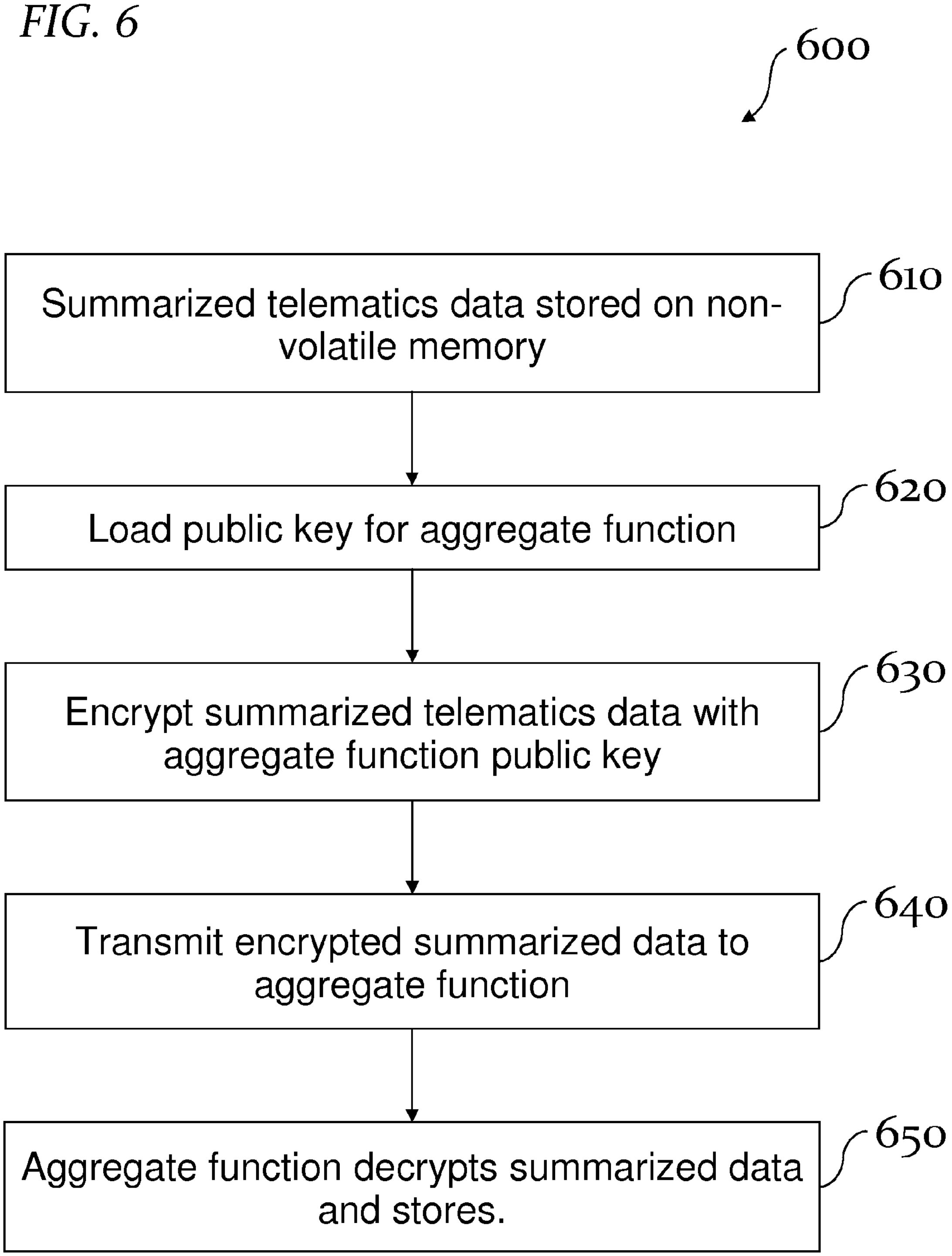
FIG. 6 is a flowchart of a method 600 showing how to encrypt telematics data for transfer to the aggregate function.

FIG. 6 is a flowchart of a method 600 showing how to encrypt telematics data for transfer to the aggregate function. In some embodiments, method 600 includes operation 610 of storing summarized telematics data on non-volatile memory (e.g., in smartphone 124), operation 620 of loading public key from aggregation element 140, operation 630 of encrypting summarized telematics data with aggregation element's public key, operation 640 of transmitting encrypted summarized data to aggregation element 140, and operation 650 of the aggregation element decrypting summarized data and storing the decrypted results.

Figure 7:
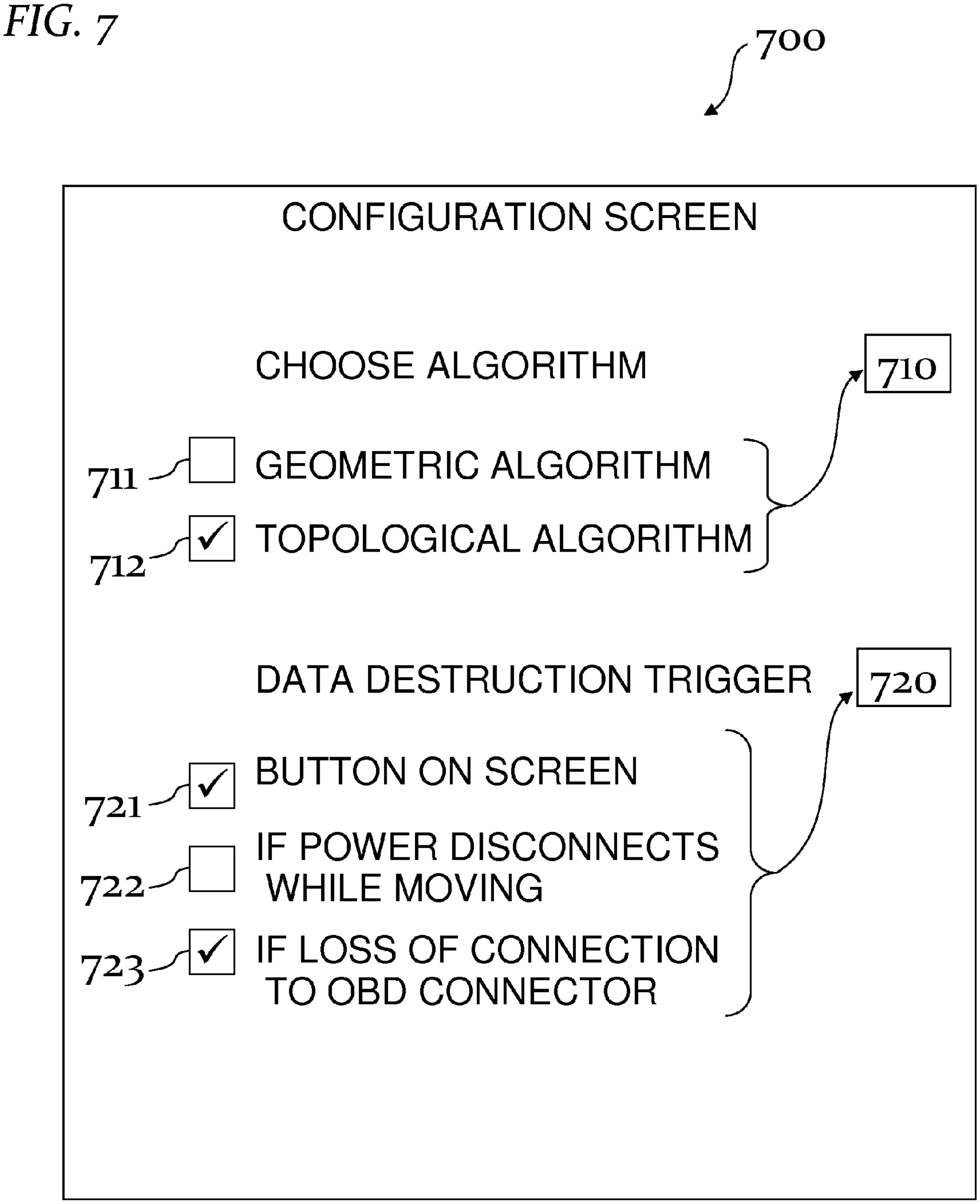
FIG. 7 is a diagram of an exemplary menu 700 for configuring the algorithm to be used for determining points to record data.

FIG. 7 is a diagram of an exemplary configuration menu 700 for configuring the algorithm to be used for determining points to record data. In some embodiments, menu 700 elicits and receives selection data from a user to indicate a specification (e.g., selection 711 or 712 that is loaded into specification parameter 710) that specifies an algorithm that is to be used by method 812 (FIG. 8C) that is shown in more detail in FIG. 12, FIG. 13, and FIG. 14. In some embodiments, menu 700 also elicits and receives selection data from a user to indicate a specification (e.g., one or more of selections 721, 722, and/or 723 that is/are loaded into specification parameter 720) for a data-destruction trigger (e.g., in some embodiments, for example, the trigger can include a user pressing a button on a display screen (if selection 721 is active), and/or upon loss of the connection to the OBD connector (if selection 723 is active; in some embodiments, when the OBD port of Bluetooth® transmitter 122 is connected to the car's OBD jack, there would not be any reason for the user to unplug it while the car is en-route (moving); therefore loss of connection to the Bluetooth® OBD while under way is another anomalous situation which the user can instruct the system to interpret as a request to destroy the data)). In some embodiments, menu 700 elicits and receives (722) a specification to: destroy this current trip's data if power input to the smartphone is disconnected while user's car is moving (for example, if a user desires to erase data for a particular trip, she may choose to unplug her smartphone from its charging cable, and this unplugging action would destroy the trip's data if specification 722 is active).

Figure 8B:
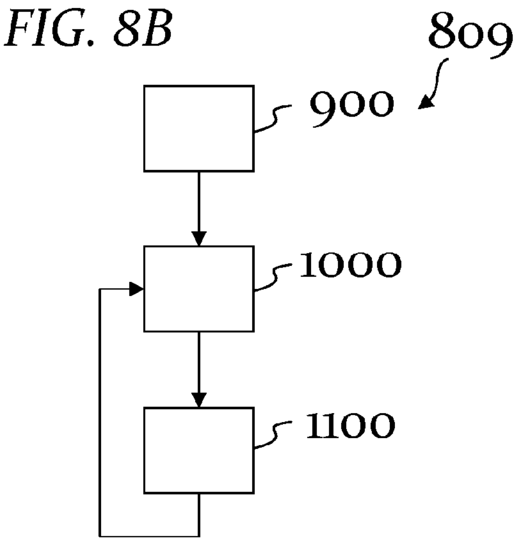
FIG. 8B is a flowchart of a method 809 shown in more detail in FIGS. 9, 10, and 11.
Figure 9:
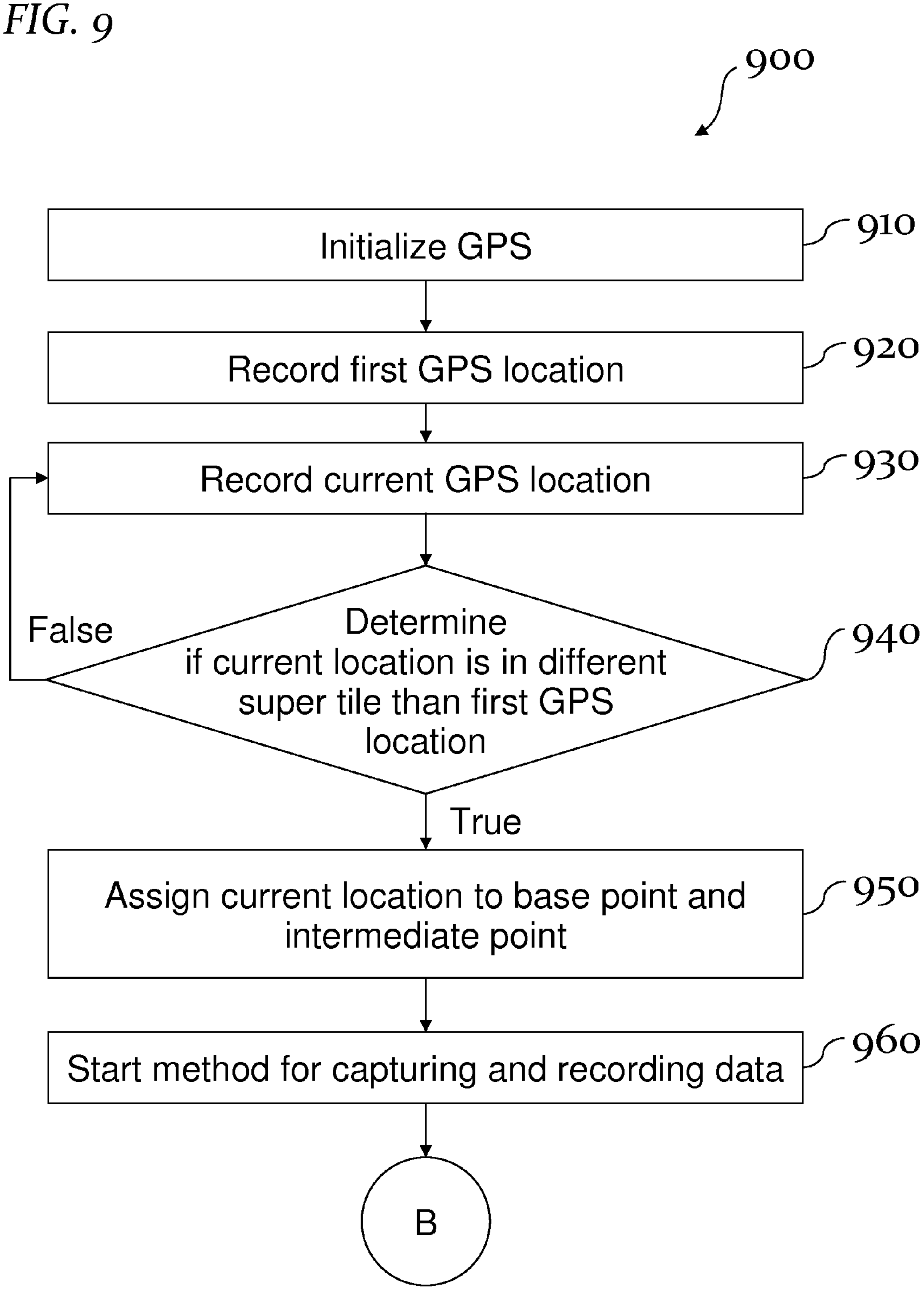
FIGS. 9, 10, and 11 are flowchart segments 900, 1000, and 1100 that together provide a flowchart of method 809 for making start and end points anonymous using a geometric algorithm.
Figure 10:
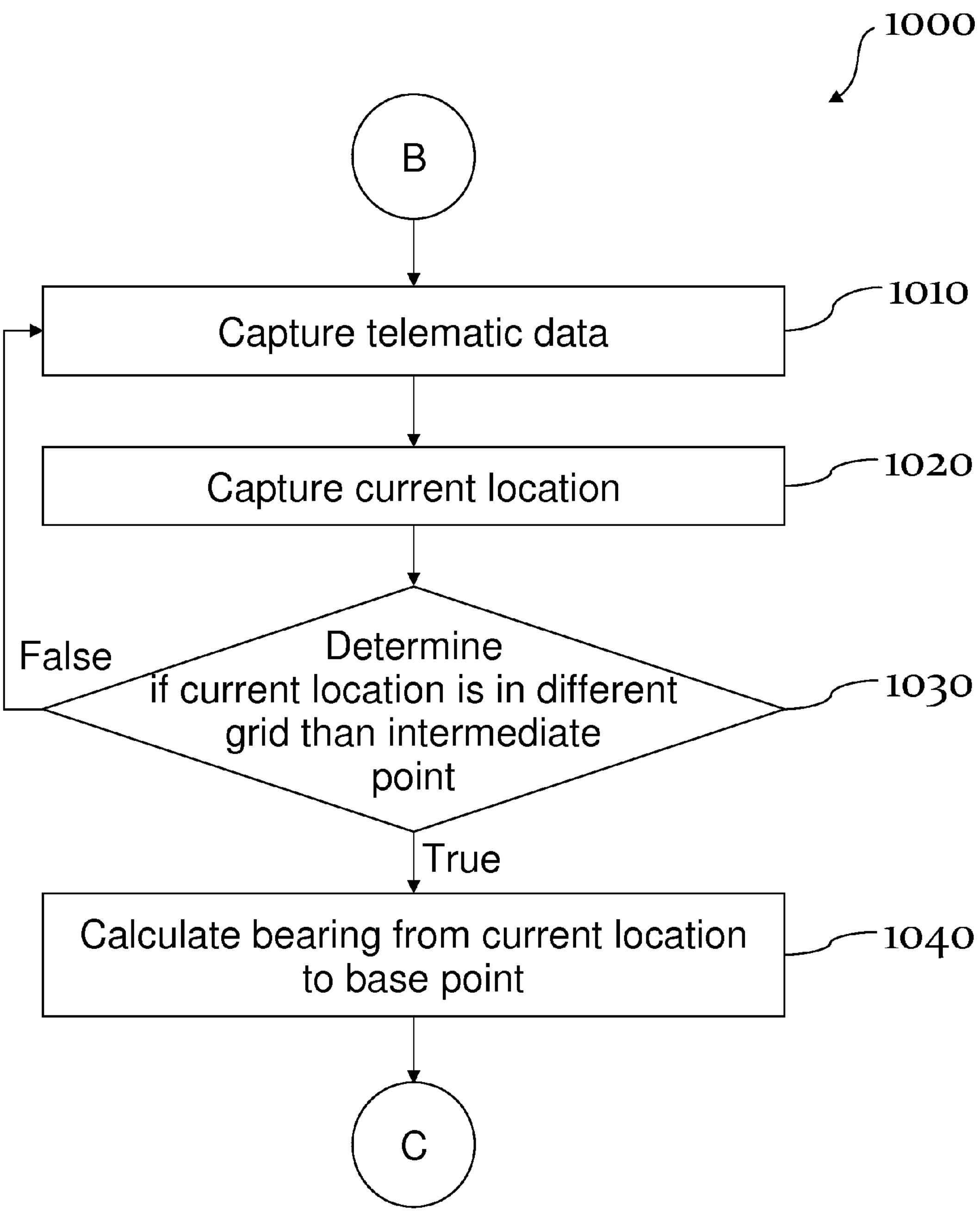
Figure 11:
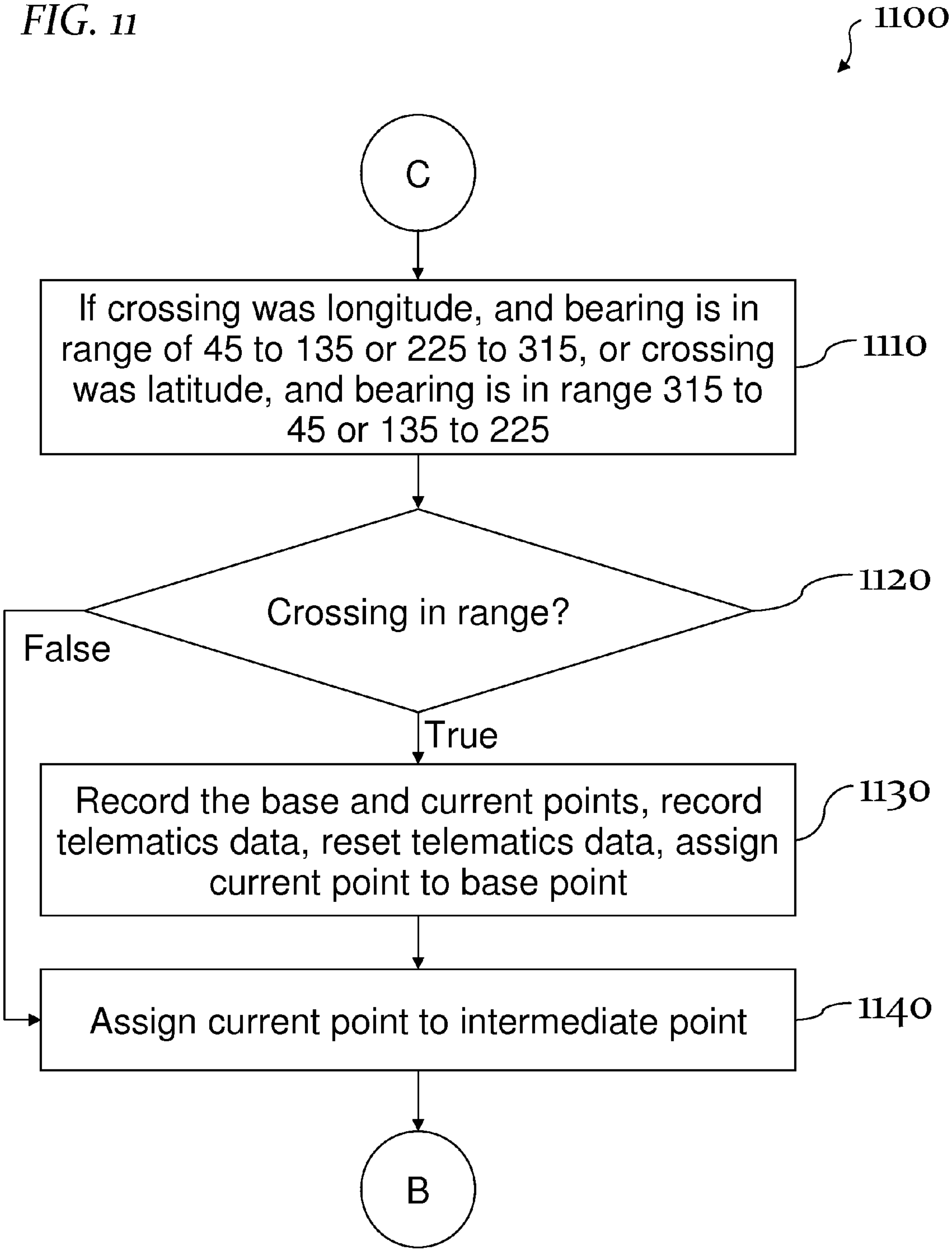

FIG. 8B is a flowchart of a method 809 shown in more detail in FIG. 9, FIG. 10, and FIG. 11. In some embodiments, method 809 includes the functionality shown in flowchart segments 900, 1000, and 1100.

Figure 8C:
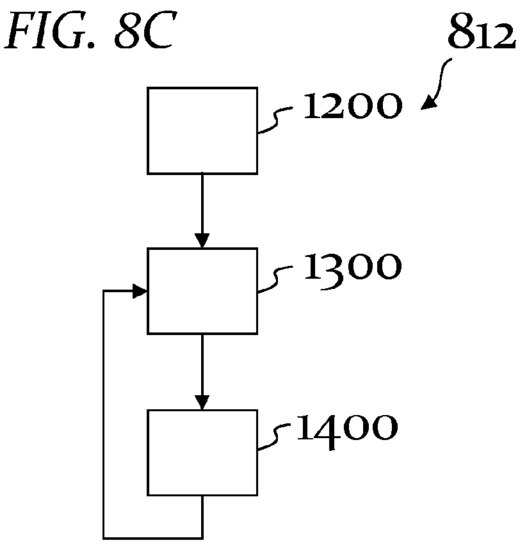
FIG. 8C is a flowchart of a method 812 shown in more detail in FIGS. 12, 13, and 14.

FIG. 8C is a flowchart of a method 812 shown in more detail in FIG. 12, FIG. 13, and FIG. 14, described below. In some embodiments, method 812 includes the functionality shown in flowchart segments 1200, 1300, and 1400.

FIG. 9 is a flowchart segment 900 showing a first portion of method 809 for making start and end points anonymous using a geometric algorithm. In some embodiments, method 900 includes operation 910 of initializing the GPS unit, followed by operation 920 of recording a first GPS location; followed by operation 930 of recording current GPS location, followed by operation 940 of determining whether the current GPS location is in a different super tile than the first GPS location. If the current GPS location is not in a different super tile than the first GPS location, control is passed back to operation 930; else control goes to operation 950, which assigns the current location to both a base point variable and an intermediate point variable, followed by operation 920 of starting the method for capturing and recording data set forth in FIG. 10.

Figure 17:
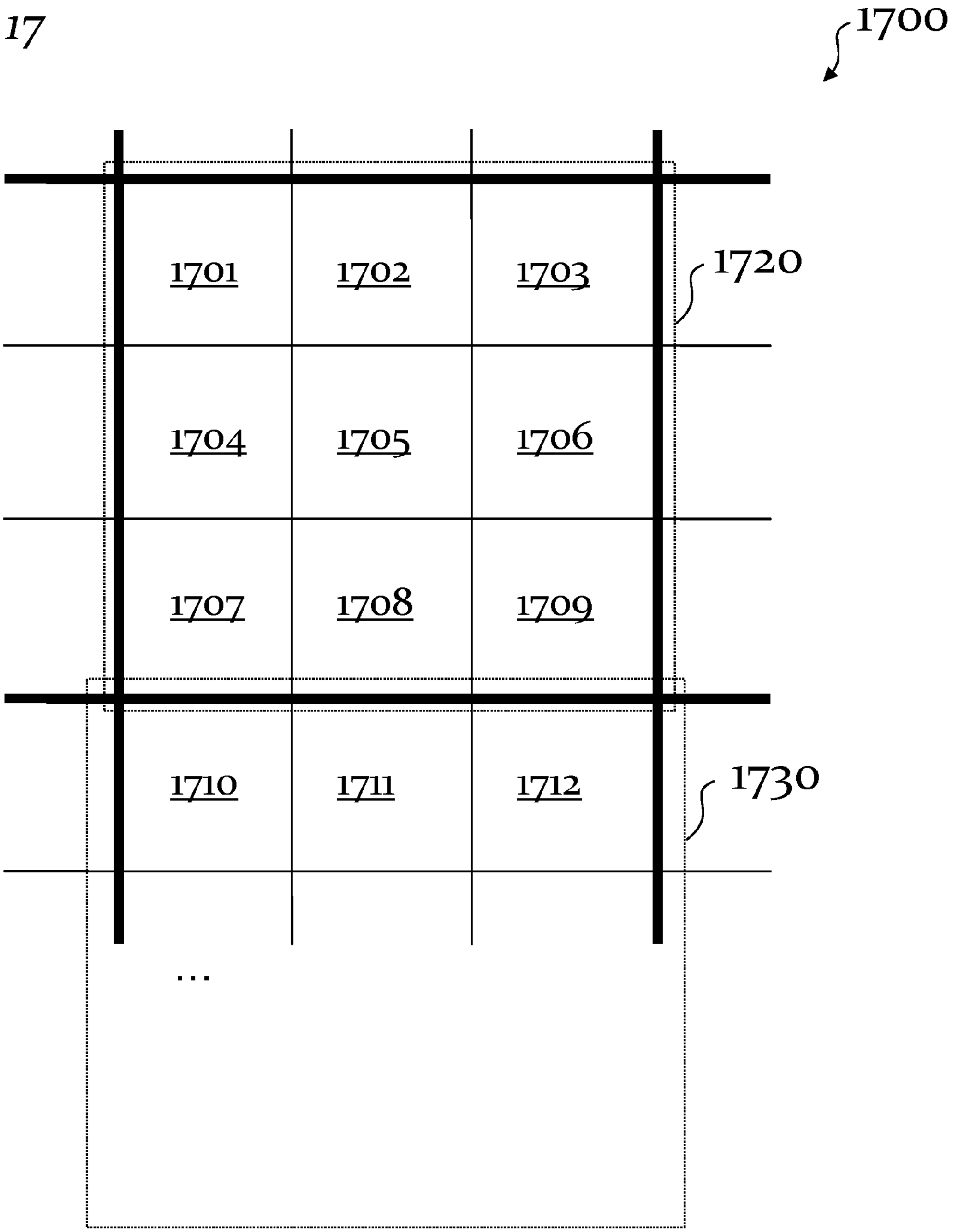
FIG. 17 is a drawing 1700 showing a 3-by-3 supertiling of a small area of the sphere.
Figure 18:
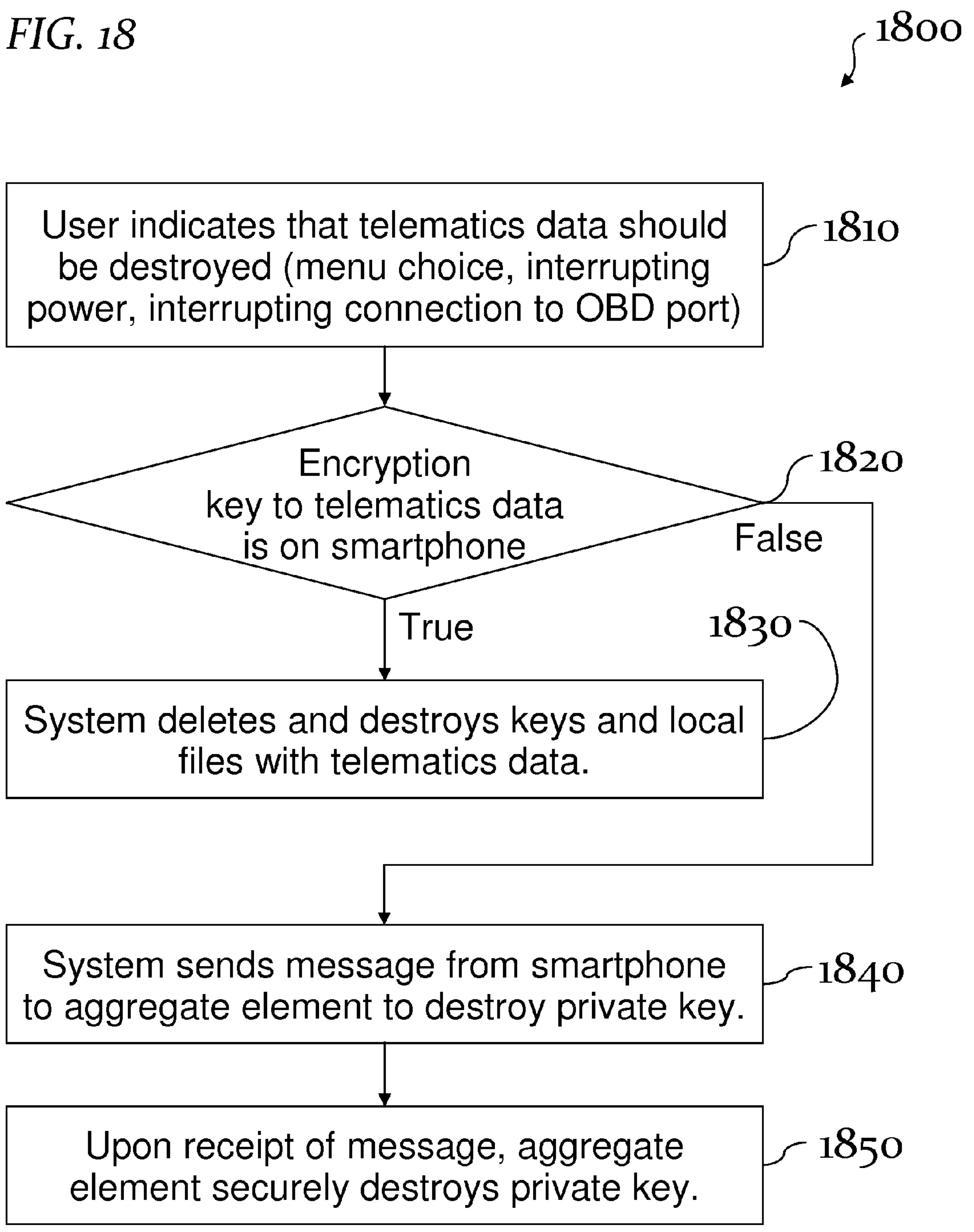
FIG. 18 is a flowchart of a method 1800 for destroying telematics data based on user actions.

FIG. 10 is a flowchart segment 1000 showing a second portion of method 809 for making start and end points anonymous using a geometric algorithm. In some embodiments, the geometric algorithm is selected by user 91 (FIG. 1) using menu 700 (FIG. 7) via method 1800 (FIG. 18). In some embodiments, the geometric algorithm uses grid lines based on latitude and longitude (lat/lon grid lines) that separate quadrilateral grid areas (as used herein, grid areas are defined by lat/lon grid lines). In some embodiments, method 1000 includes operation 1010 of capturing telematic data, followed by operation 1020 of capturing the current location, followed by operation 1030 of determining whether current location is in a different grid area than the intermediate point. If the current location is in the same grid area than the intermediate point, control is passed back to operation 1020; else (because the current location is in a different grid area than the intermediate point, which involves crossing a longitude and/or latitude grid boundary; i.e., a lat/lon grid line) control goes to operation 1040 of calculating a bearing from the current location to the base point. Control then passes to operation 1110 of FIG. 11. In some embodiments, a super tile (see FIG. 17) includes one or more grid areas, wherein each grid area is in one and only one super tile.

FIG. 11 is a flowchart segment 1100 showing a portion of method 809 for making start and end points anonymous using a geometric algorithm. In some embodiments, method 1100 includes operation 1110 of determining if the grid-boundary crossing (determined by operation 1030 of FIG. 10) was longitude, and bearing is in range of 45 to 135 or 225 to 315, or if grid-boundary crossing was latitude, and bearing is in range 315 to 45 or 135 to 225. Control passes to operation 1120 of determining if the crossing was in the respective longitude or latitude range, and if so control passes to operation 1130 of recording the base and current point, recording telematics data, resetting telematics data, and assigning the current point to the base point, followed by operation 1140 of assigning the current point (i.e., the current location's coordinate values obtained from the GPS) to be the intermediate point. If, in operation 1120 the crossing is determined not to be in range, control passes to operation 1140 (described above). After operation 1140 control passes to operation 1010 of FIG. 10.

Data does not Identify User.

In some embodiments, when storing the data on the smartphone or when transmitting the data from the smartphone to the aggregating element, the VIN field 210 is changed so that it does not specifically identify the vehicle 800. In some embodiments, the hardware 120 queries (operation 810) the vehicle 110 for the VIN and replaces the serial number part of the VIN in the response with invalid elements, for example the letter Q (operation 820).

In some embodiments, it is necessary (or perhaps simply desirable) to ensure that data sent from a smartphone to the aggregating element be credited to or associated with an approved user of the aggregating element, to avoid storing or using invalid data being sent to the aggregating element 140. In this case, the smartphone 124 has a private key (which it keeps secure) and a public key (which it shares with the aggregation element 140). In the case that administrators and/or program of the aggregating element 140 determine that bogus data is arriving from a particular user, the administrators can invalidate the user's public key and remove previous data sets received from that user. Each user 91 is motivated to keep their private key private so that no one can trace the data on the aggregating element 140 back to that user 91.

Data does not Identify User's Start and Destination Locations.

In some embodiments, the present invention includes a method that makes determination of exact starting points of a particular vehicle very difficult to infer, even if the user of that particular vehicle travels the same routes daily.

In some embodiments, a GPS device 130 located in the vehicle, working in conjunction with the vehicle-telematics-data-gathering functionality 120, identifies start and end points for data collection. The end point of one data collection interval becomes the start point for the next data collection interval. In some embodiments, the present invention uses a tiling of the sphere where the tiles are defined and/or specified by the one (1) minute (1/60 of one degree) of longitude and/or one (1) minute of latitude lines. (One (1) minute of latitude is approximately 1 nautical mile=1852 meters.) This method results in a tiling of the globe 1600, where each tile has boundaries along the minutes of latitude and longitude. (Other local or global tilings can be used, as mentioned above, such that a selected one of a plurality of other geometric shapes is used for each tile). With this tiling, a vehicle can be in one and only one tile at any given time, as measured by the system's GPS unit (if the location is on the line defining two different tiles, the location is considered to be in the tile that the vehicle was previously in).

In some embodiments, the method of determining these start and end points for data collection intervals is as follows. The GPS unit 130 located in the vehicle 110 can determine the latitude and longitude of the unit (and by extension, the vehicle) to a good degree of accuracy (approximately 10 m or better). It can produce updates at rates better than or equal to 1 update per second.

The user 91 chooses (from menu 400, see FIG. 4) a range value (endpoint buffer) 410 reflecting how close to or far from the start and destination locations the user is comfortable recording information, with typical values being 1 (comfortable with a measurement arbitrarily close to start or destination locations), 2, 4, or 6 minutes of latitude and longitude, or up to 20 minutes of latitude and longitude. The endpoint buffer value should be a non-negative integer.

In some embodiments, based on the user's choice for the endpoint buffer distance, the system of the present invention creates a super tiling 1700 of the globe so that each super tile is approximately the buffer distance larger (in each dimension) than the standard tiling. For example, using minutes of latitude and longitude as the tiling, the GPS location N38 degrees 53.353', W77 degrees 3.002' is in the tile with southwest corner N38 degrees 53', W77 degrees 4'. The 3-by-3 super tile 1720 containing this point (assuming that all super tilings are set up so that 0 degrees latitude, 0 degrees longitude is the southwest corner of some reference super tile, as is the case in some embodiments) has southwest corner N38 degrees 51', W77 degrees, 6'. (In some embodiments, the tilings and super tilings that are south of S179 degrees and 59' are denoted by S180 degrees and the longitude of their west side.) If the system allows the user to choose super tiling (endpoint buffer), sizes which do not evenly divide 180*60, the system should also ensure that the super tiling covers the local area (an area that the vehicle will reasonably be expected to be confined to) so that the vehicle can be in one and only one super tile at any time. All users who choose the same configuration should result in the same super tiling of that local area.

Referring again to FIGS. 8B, 9, 10, and 11, in some embodiments, using method 809, the system starts determining location using method 809 shown in flowcharts 900, 1000, and 1100, starting with using the GPS functionality at operation 910 and recording the first GPS location at operation 920. The system continues to measure location at operation 930. As soon as the vehicle leaves the initial supertile at operation 940 (the supertile in which the first GPS location is located), the current location measured becomes the base point and the intermediate point 950, and the capture of telematics data begins at operation 960, (also see operation 1010 of FIG. 10). When the next location fix is available from the GPS it stores this location measurement as the current point 1020.

The system compares the current point with the intermediate point to determine if the two points lie on different sides of a minute of longitude or latitude at operation 1030. For example, the points N38 degrees 53.353', W77 degrees 3.002' and N38 degrees 53.355', W77 degrees 2.940' lie on either side of the longitude line W77 degrees 3'.

If the current point lies on a different side of a minute of longitude or latitude than the intermediate point, the algorithm calculates the bearing from the current point to the base point at FIG. 10's operation 1040 (and not vice versa), using the formula on page 332 of the 2002 edition of Bowditch (The American Practical Navigator). If the line crossed is a longitude, and the bearing is between 45 degrees (NE) and 135 degrees (SE) or if the bearing is between 225 degrees (SW) and 315 degrees (NW), (similarly, if the line crossed is a latitude, and the bearing is between 135 degrees (SE) and 225 degrees (SW) or between 315 degrees (NW) and 45 degrees (NE))—operations 1110 and 1120 of FIG. 11—then the telematics data collected since the base point was identified is stored with start point being the base point, and the end point being the current point by operation 1130. The current point becomes the new base point by operation 1120 (and intermediate point by operation 1130), and the telematics data is reinitialized for a new collection interval at operation 1010.

Figure 15:
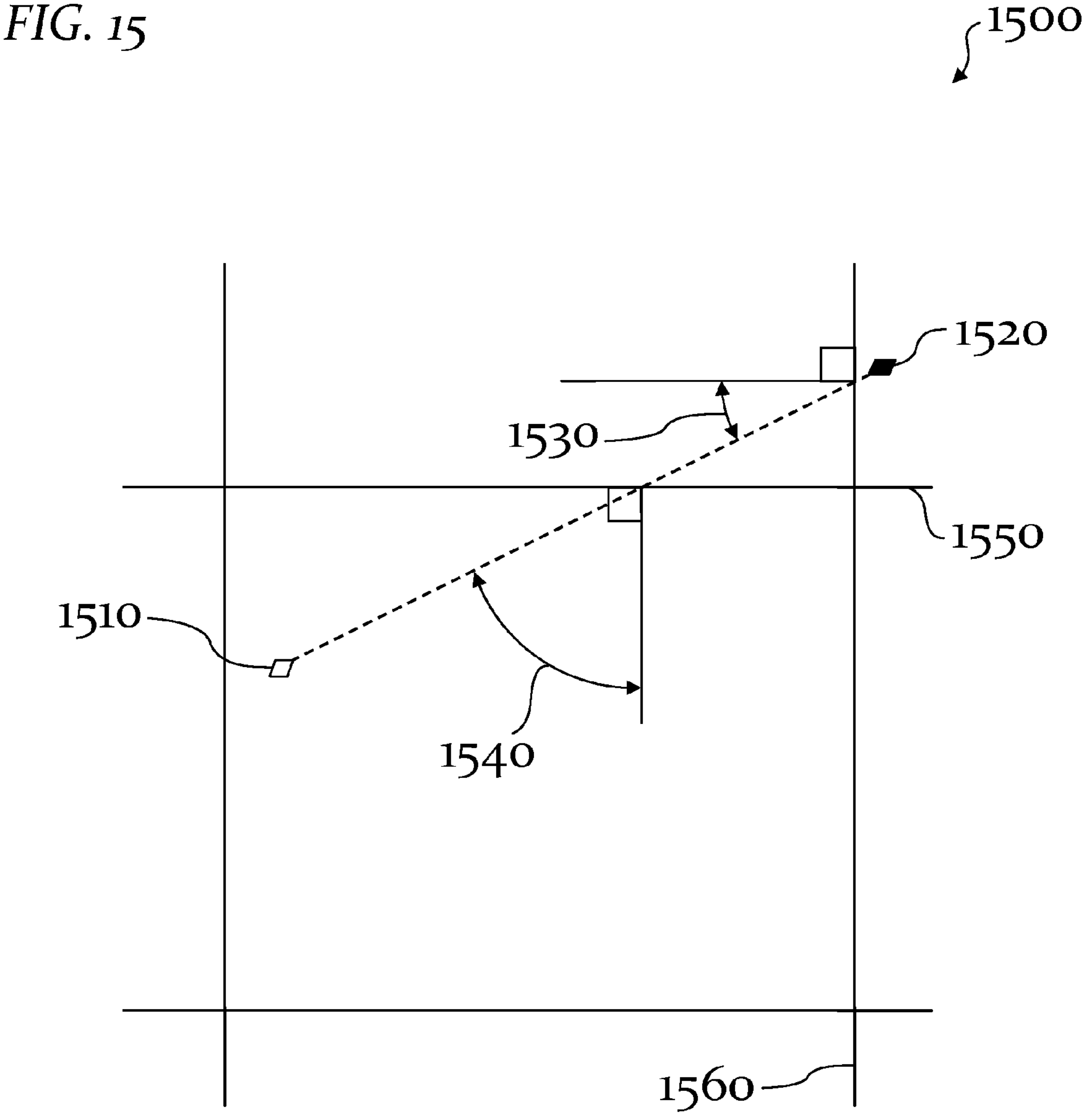
FIG. 15 is a drawing 1500 showing the geometry for determining the angle of crossing for the geometric algorithm.

See FIG. 15 for an illustration of the explanation as follows. Consider a vehicle path from location 1510 to location 1520, in a direction ENE (east-north-east). The angle 1540 that the path crosses the normal to the line of latitude 1550 is greater than 45 degrees. In other words, the bearing from that crossing point to 1510 is outside of the range 135 to 225 degrees (and it is certainly outside of the range of 315 to 45 degrees). Now consider when the path crosses the longitude 1560. The angle 1530 that the path crosses the normal to the line of longitude 1560 is less than 45 degrees. In other words, the bearing of the path from 1520 to 1510 is between 225 degrees and 315 degrees, so this crossing will result in a new point and telematics information being recorded.

Users would like to see that their location information does not show their exact starting and end points. A simple method to avoid doing this would be to have the system record data when the device has traveled some distance away from the start point, for example five (5) miles, and then continue recording information at random or semi-random intervals (such as time or distance traveled). A bad person, seeking to identify the source of telematics data, might take the data and look at the start point for a number of trips from the same (anonymized) vehicle and user. The bad person need only take a map, draw a radius of five miles from several of the starting capture points, and look for the intersection of these radii. Similarly, if the device does not record data closer than five miles to the stopping point by queuing up data in the device read-write random-access memory (RAM) until the device stops and then writing data which is more than five miles from the stopping point (and the starting point) to long term memory or disk file system, if enough of these trips are taken, the bad person can infer the destination. Also note that the user will then be starting a later trip from that previous destination, and the bad person can again use these methods to determine possible destinations.

If the current point lies on a different side of a minute of longitude or latitude (in other words, in a different tile) than the intermediate point determined by operation 1030, but the remaining inequalities in the previous paragraph fail determined by operations 1110 and 1120, then the current point becomes the intermediate point at operation 1140 and the algorithm continues at operation 1010.

In theory, there are some subtle possible paths that can be degenerate and which can result in no data being collected for a long period of time. As a result, a second algorithm which does not suffer this degeneracy is provided here.

Continuing with the notation of a tiling of the sphere from above, we note that two tiles are adjacent if there is a path from one tile to another that crosses through no other tiles. For example, there is a path from tile 1601 to tile 1605 in FIG. 16. For the purposes of this invention, we also consider two tiles M, N to be adjacent if a GPS measurement is in tile M then the immediately following GPS measurement is in tile N. For example, if one GPS measurement puts the vehicle first in tile 1602, and the next GPS measurement puts the vehicle in tile 1611, we consider these tiles to be adjacent. (We expect that the tiling to be defined such that in practice with low GPS location error vehicles would not be able to achieve this. Using the tiling we suggest, for example at 79 degrees north, the latitude of Ny-Alesund, Svalbard, Norway, the northern most inhabited location, a vehicle would have to be traveling at more than 353 meters per second (1260 km/h) in order to meet this condition if GPS measurements are made at a frequency of 1 Hz.)

Figure 16:
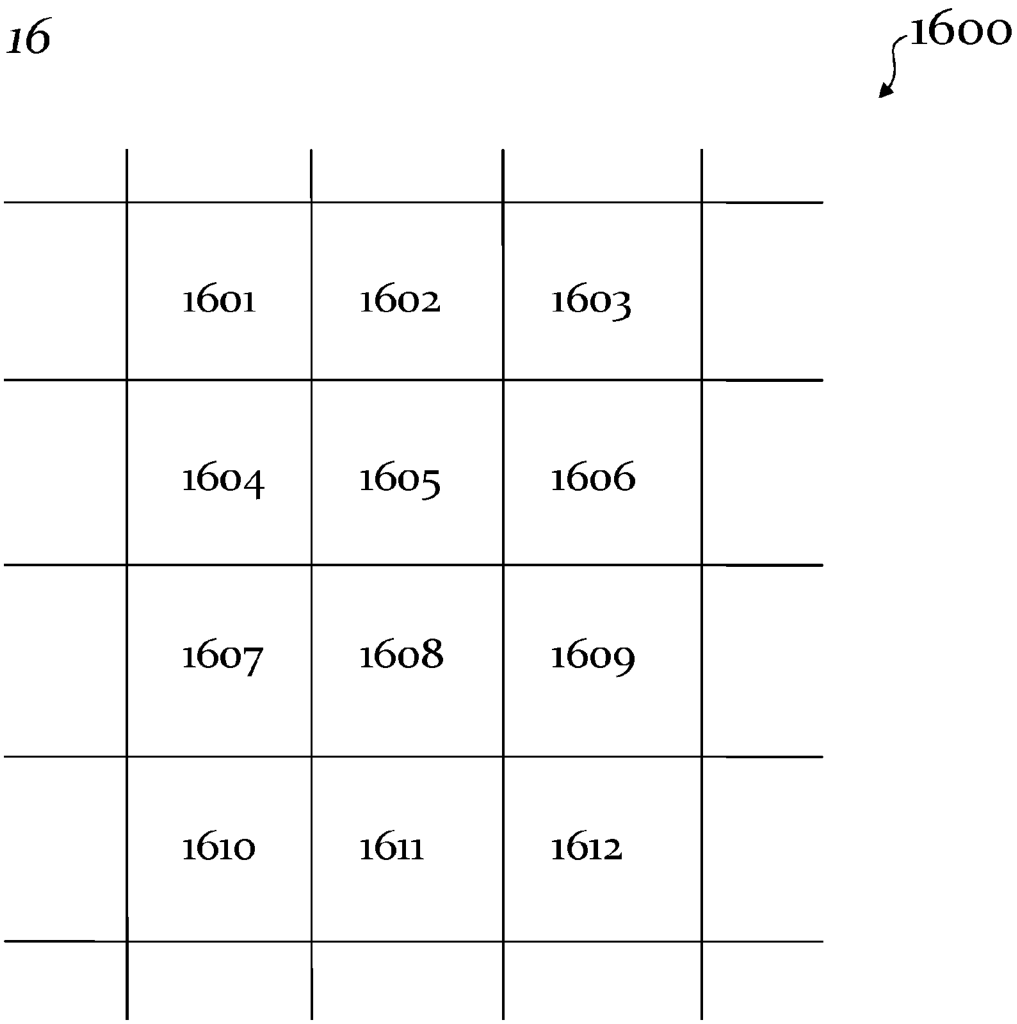
FIG. 16 is a drawing 1600 showing a tiling of a small area of the sphere

The determination of the set "T" of tiles is the set intersection of the set of tiles around the first tile and the set of tiles around the second tile, set union with the first tile and the second tile. Referring to FIG. 16, the set "T" of tiles adjacent to tiles 1605 and 1608 is the set 1604, 1605, 1606, 1607, 1608, and 1609. The set "T" of tiles adjacent to tiles 1601 and 1605 is the set 1601, 1602, 1604, and 1605. The set "T" of tiles adjacent to 1603 and 1607 is the set 1603, 1605, 1607. The set "T" of tiles adjacent to 1601 and 1610 is the set 1601 and 1610.

Again, FIG. 8C is a flowchart of method 812 shown in more detail in FIG. 12, FIG. 13, and FIG. 14, described below. In some embodiments, method 812 includes the functionality shown in flowchart segments 1200, 1300, and 1400.

Figure 12:
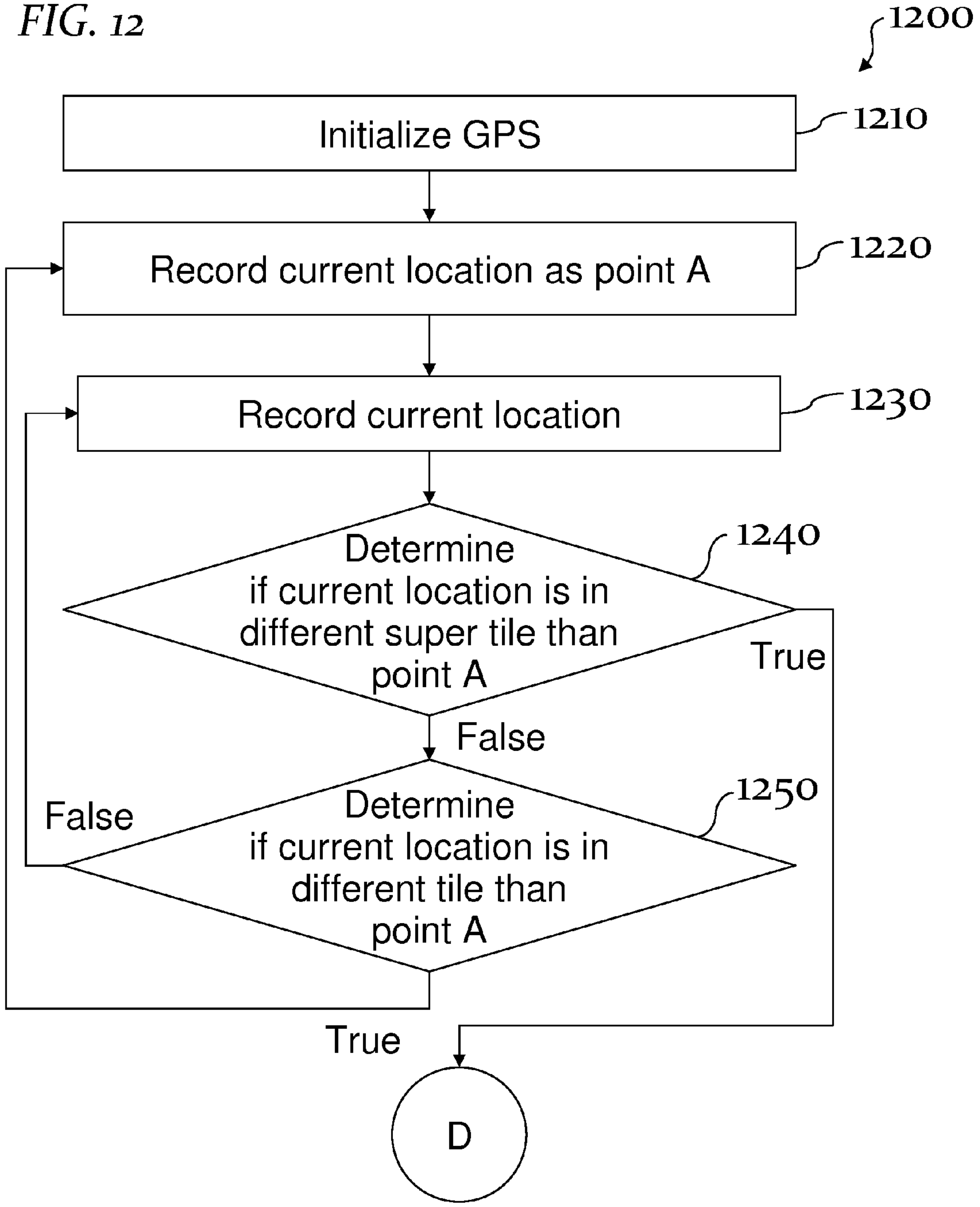
FIGS. 12, 13, and 14 are flowchart segments 1200, 1300, and 1400 that together provide a flowchart of method 812 for making start and end points anonymous using a topological algorithm.

FIG. 12 is a flowchart segment 1200 showing a first portion of method 812 for making start and end points anonymous using a topographical algorithm. In some embodiments, method 1200 includes operation 1210 of initializing the GPS unit, followed by operation 1220 of recording a current GPS location as point "A"; followed by operation 1230 of again recording current GPS location, followed by operation 1240 of determining whether the current GPS location is in a different super tile than point "A": if the current GPS location is in a different super tile than point "A", control is passed through connector D to operation 1310 of FIG. 13; if operation 1240 determines that the current GPS location is not in a different super tile than first GPS location, control is passed to operation 1250; at operation 1250 if the current GPS location is not in a different tile than first GPS location, control is passed back to operation 1230; else control goes to back to operation 1220, which resets point "A" and continues as above.

Figure 13:
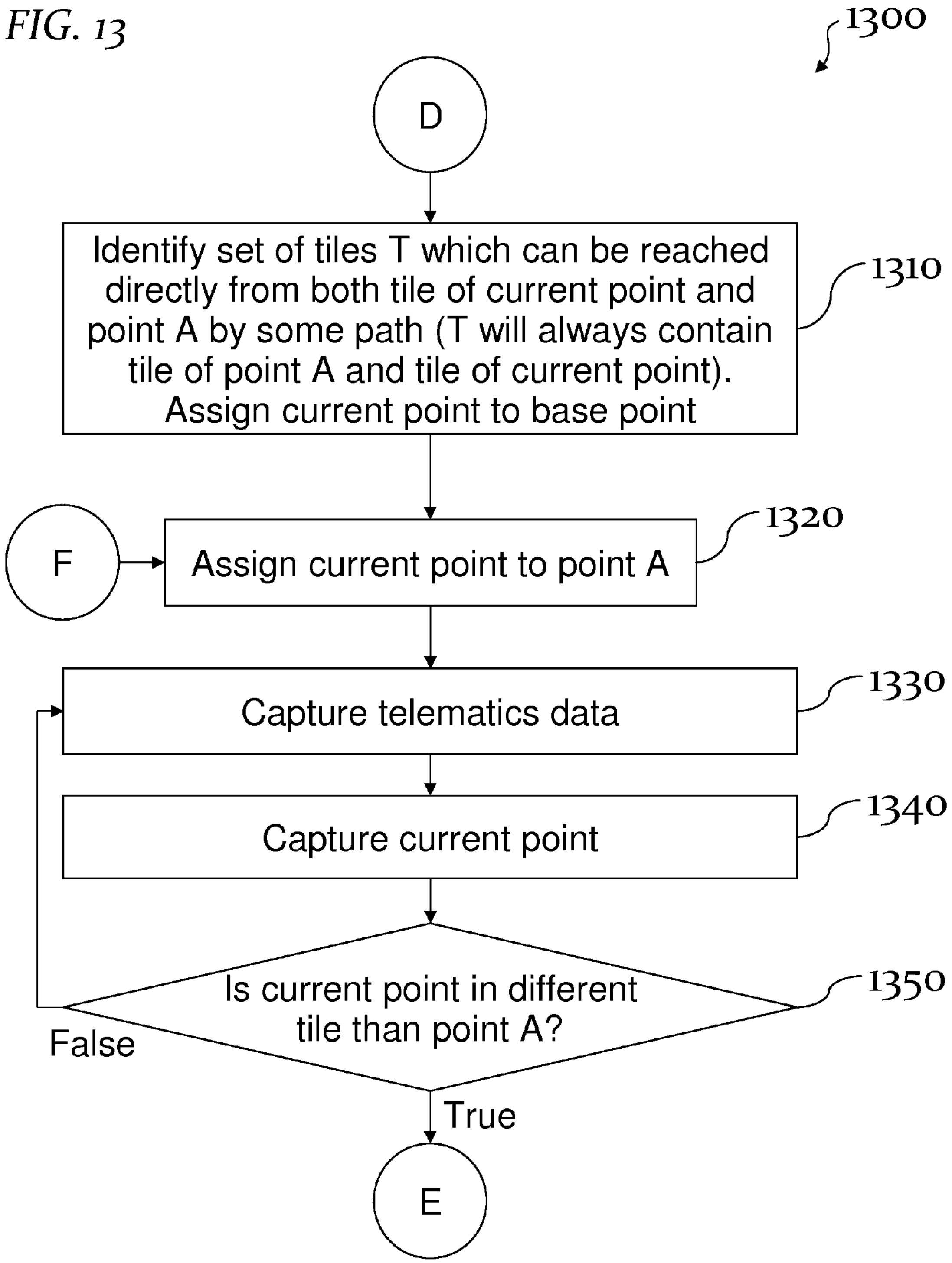

FIG. 13 is a flowchart segment 1300 showing a second portion of method 812 for making start and end points anonymous using a geometric algorithm. In some embodiments, method 1300 includes arriving through connector D to operation 1310 of identifying a set of tiles T that can be reached directly from both the tile of current point and from point A by some path (T will always contain tile of point A and tile of current point); and assigning the current point to be the base point, followed by operation 1320 of assigning location values of the current location or point to be point "A", followed by operation 1330 of capturing telematics data; followed by operation 1340 of capturing the current point; then operation 1350 determines whether current location is in a different tile than the point "A". If the current point is in the same tile as point "A" (i.e., the test result is FALSE), control is passed back to operation 1330; else (because the current location is in a different tile than point "A", which involves crossing a tile boundary) control goes through connector E to operation 1410 of FIG. 14.

Figure 14:
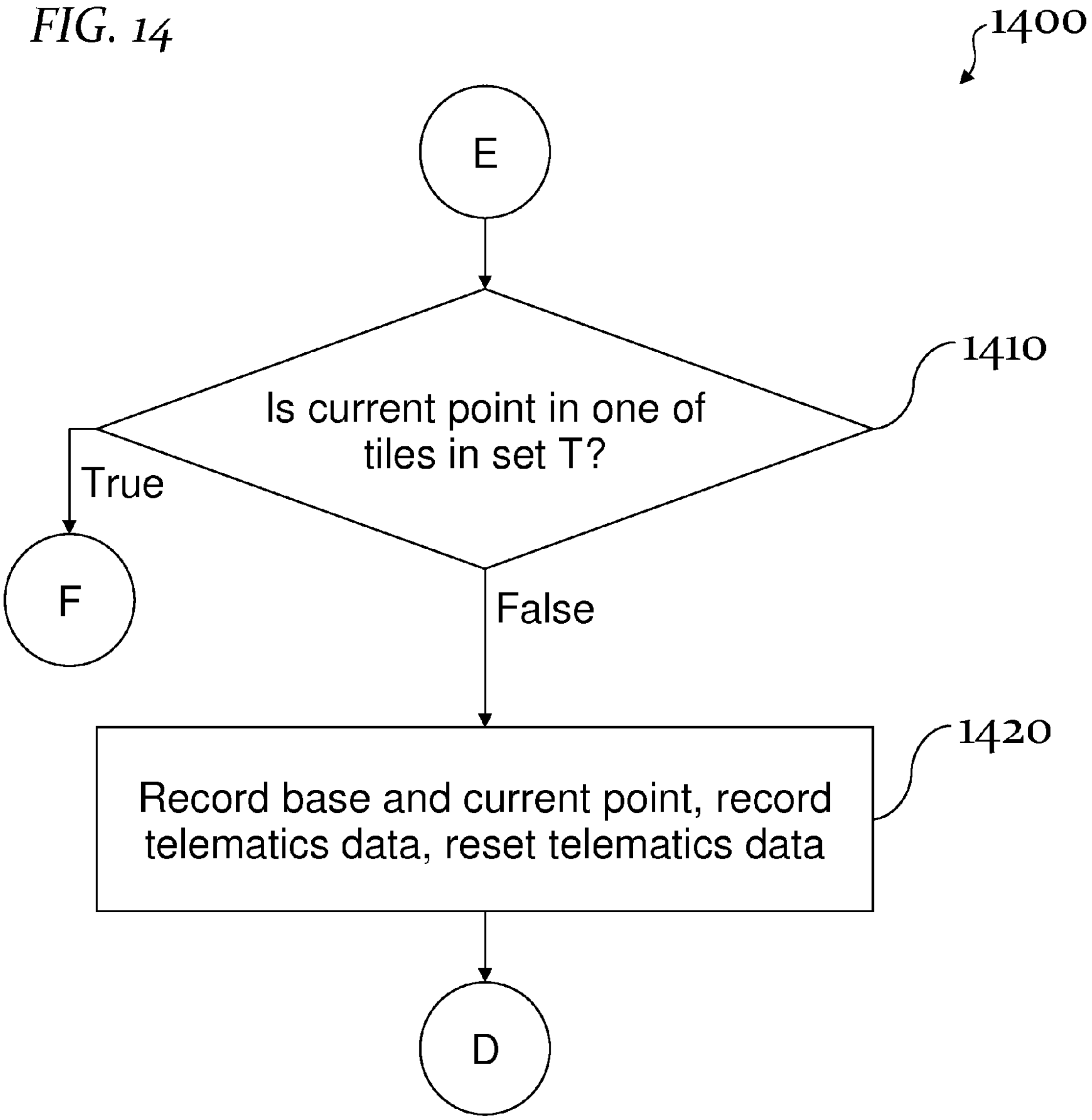

FIG. 14 is a flowchart segment 1400 showing a portion of method 812 for making start and end points anonymous using a geometric algorithm. In some embodiments, method 1400 includes entering through connector E to operation 1410 of determining whether the current point is in one of the tiles in set "T"; and if so returning through connector F to operation 1320 of FIG. 13; and if not, doing operation 1420 of recording the base and the current point, recording telematics data, and resetting telematics data; control then passes through connector D to operation 1310 at the top of FIG. 13.

When this alternative method 812 (see FIG. 8C, as shown in more detail in flowchart segments 1200, 1300, and 1400 of FIGS. 12, 13, and 14) begins at operation 1210 which initializes the GPS receiver, and the first location is called point A by operation 1220. If the location measurement from operation 1230 indicates that the current point of the vehicle is in a different tile than the tile containing point A as determined by operation 1250, but not in a new supertile as determined by operation 1240, then point A is set to be the current point by operation 1220. For example, referring to FIG. 17, tiles 1702 and 1703 are in the same supertile 1720, but tiles 1709 (in supertile 1720) and 1712 (in supertile 1730) are in different supertiles. If the current point is in a new supertile as determined by operation 1240, then several things occur. The set of tiles that are adjacent to the tile containing point A and the tile containing the current point is called the set "T" of tiles in operation 1310. The base point (by operation 1310) and the point "A" (by operation 1320) are assigned the value of the current point. The method starts recording telematics data (by operation 1330) and measuring the current location (by operation 1340).

If the current point is in a different tile than point A (as determined by operation 1350), but the current point is in the set "T" of tiles 1410, the point A is assigned the value of the current point 1320. If the current point is not in the set "T" of tiles 1410, the telematics data is recorded and a new set of telematics data is started 1420. The set "T" of tiles (by operation 1310) is updated to be the tiles that are adjacent to the tile containing point A and the tile containing the current point. The base point (by operation 1310) and the point A (by operation 1320) are assigned the value of the current point. The method continues measuring telematics data and determining the next location.

This topological algorithm (e.g., method 812; see FIGS. 8C, 12, 13, and 14) can be used for any tiling of the sphere, including triangular and soccer-ball tilings (i.e., tilings using hexagons and pentagons), with supertilings.

Figure 19:
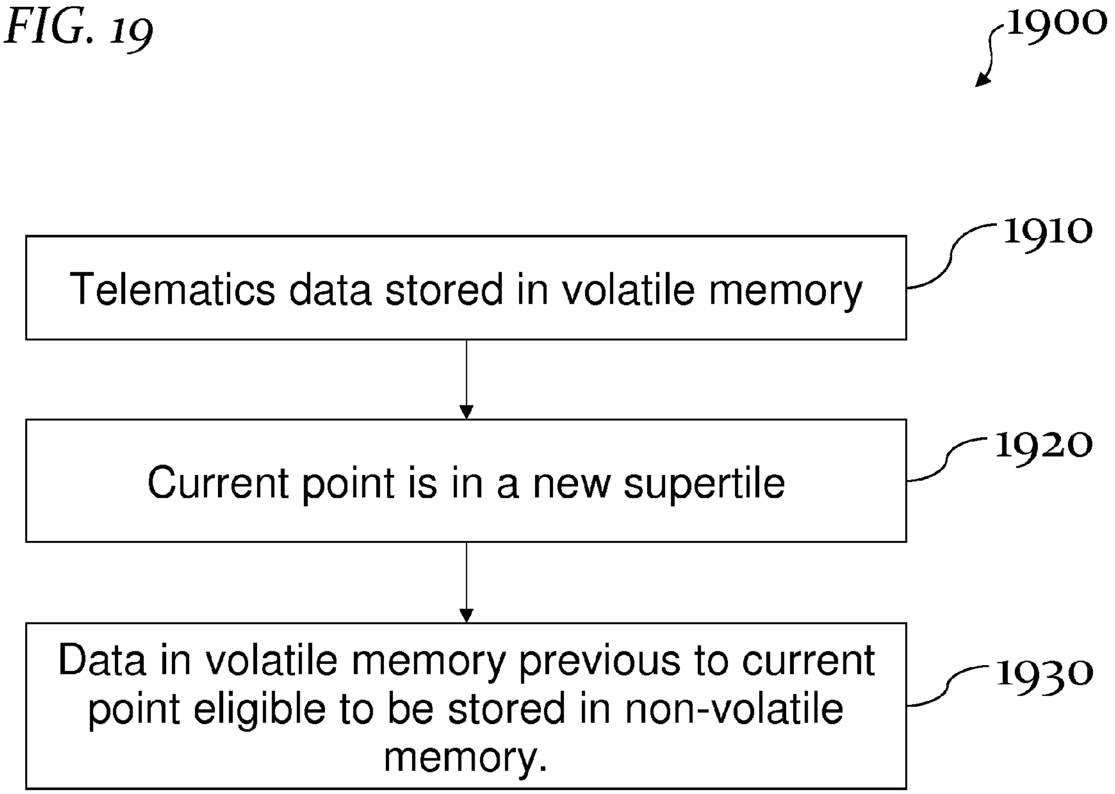
FIG. 19 is a flowchart of a method 1900 for determining when to write data in volatile memory to non-volatile memory.

FIG. 19 is a flowchart of a method 1900 for determining when to write data in volatile memory to non-volatile memory. In some embodiments, in order to maintain privacy of destinations, in method 1900, operation 1910 keeps data in volatile memory (wherein the data will automatically be erased once power is removed from the memory) and data is not saved to non-volatile memory until after the device has entered a new supertile as determined by operation 1920. Only after this has occurred should the system, using operation 1930, store data to its non-volatile memory, and it should include only data that was captured before the vehicle is determined to be entering the destination supertile (in some embodiments, this determination also done by operation 1930; in some embodiments, any data regarding the final destination supertile that may have been written into the non-volatile memory is erased by operation 1930; however, in other embodiments, method 1800 described below uses other ways to handle some such situations). In some embodiments, this paragraph and FIG. 19 apply to either the geometric method (e.g., method 809 of FIGS. 8B, 9, 10, and 11) or the topographical method (e.g., method 812; see FIGS. 8C, 12, 13, and 14).

Destroying Data.

FIG. 18 a flowchart of a method 1800 for destroying telematics data based on user actions. In some embodiments, method 1800 includes operation 1810 that elicits and receives specifications from a user 91 (see FIG. 1), where the user indicates (e.g., in some embodiments, using a menu such as shown in FIG. 7) that telematics data should be destroyed (through one or more of a plurality of ways, for example: menu choice, interrupting power, interrupting the connection to OBD port, and/or the like). Operation 1820 determines whether the encryption key to the telematics data is on the smartphone, and if so, then operation 1830 deletes and destroys the encryption keys and the local (on the smartphone) files that have telematics information on them. If operation 1820 determines the encryption key to the telematics data is not on the smartphone, operation 1840 causes a "destroy my user's private key" message to be transmitted from the smartphone 124 to the aggregation element 140 (see FIG. 1) and operation 1850 causes the aggregation element 140 to securely destroy (e.g., erase with a plurality of write-over operations to ensure the data cannot be resurrected) the private key which is needed to decrypt the data.

There can be situations where user 91, the driver of a vehicle, would prefer to control the destruction of data stored on the vehicle. Typically, a method for deleting information from a disk drive which does not have this restriction is to execute instructions which re-write data to the same locations on the file system as the data that the user wishes to delete. It is noted that on modern smartphones 124 (see FIG. 1) that use flash memory as long-term storage (file-system storage), the flash memory has a limited number of write cycles, so the hardware and operating system on smartphones 124 that control the flash memory go to great lengths to distribute writes among the flash memory locations. This means that it may be possible, for individuals and third-party organizations which have the means to access the physical device, to access deleted files, as the data previously recorded in the files is still present in the flash device, although it is not available to the casual user.

There can be tiers of security a user might seek in controlling access to the data on the file system and the ability to destroy it easily. The lowest tier is to have no encryption of the data. If the user seeks to destroy the data, they can simply delete the file(s), which means that the files are not accessible to the casual user (but the "erased" data may still be present in the flash memory). Since the format of the data is not encrypted, it may be possible to piece the data together even if it not found in contiguous blocks. The next layer of security is to use a symmetric key. The user who wishes to destroy the data can remove the files and the symmetric key using operations 1810, 1820, and 1830. To recreate the data, the third party person or organization accessing the deleted files will have less information about the structure of the files since they are encrypted, making the job more difficult to execute. It is likely that the third party person or organization accessing the deleted files could access the symmetric key.

In some embodiments, the present invention provides a high level of security, obtained by storing the symmetric or private key on a device separate from the smartphone. For example, a thumb (USB FLASH) drive or a Bluetooth® device could be used to store the symmetric or private key. If the user desires to destroy the data, they need only destroy the data on the external thumb drive or Bluetooth® device (the device could be fitted with self destruct logic which could be triggered over the communication channel or by the user pressing a button which initiates the destruction functionality). In some embodiments, the present invention's software uses a public key to encrypt the data, and only the private key on the separate device could then be used to decrypt the data; this provides a high level of the security the user desires. In other embodiments, as an alternative, the separate device includes an SD Card (secure-data FLASH memory device) in the device, and the act of destroying the key would be to reformat with destructive writes to all of the blocks on the SD Card (this implies that the SD Card would not be used for storing other information (such as photographs)) such that when the user wishes to destroy the telematics data they also cause a process to destroy all other information on the SD Card to be executed.

In some embodiments, the present invention uses a method to store the private key on a separate machine from the smartphone, but allow a single message from the smartphone to the separate machine, via operation 1840, to request that the private key to be destroyed securely by operation 1850 so that the key could not be recovered.

In some embodiments, the present invention uses one or more of a number of methods that trigger the destruction of the telematics data that has not yet been sent to the aggregating element. In some embodiments, the user can configure, using menu 700 of FIG. 7, the methods (elicited and received by operation 1810) they wish to use as triggers to include one or more of the following: executing a user instruction on the smartphone to destroy the data (choosing a menu item in a program), disconnecting power to the smartphone while the vehicle is in operation or is moving, disconnecting the physical connection from the smartphone 124 to the OBD II port (via selection 720 of FIG. 7). The user may configure any of these actions to result in destruction of the telematics data according to their preferred method of destruction. The message to destroy the private key on the separate machine could be an e-mail message to a specific address, an SMS message to a specific telephone number, a web page request on the internet, a phone call to a specific number, or a number of other possible methods which trigger destruction of the private key.

Figure 20:
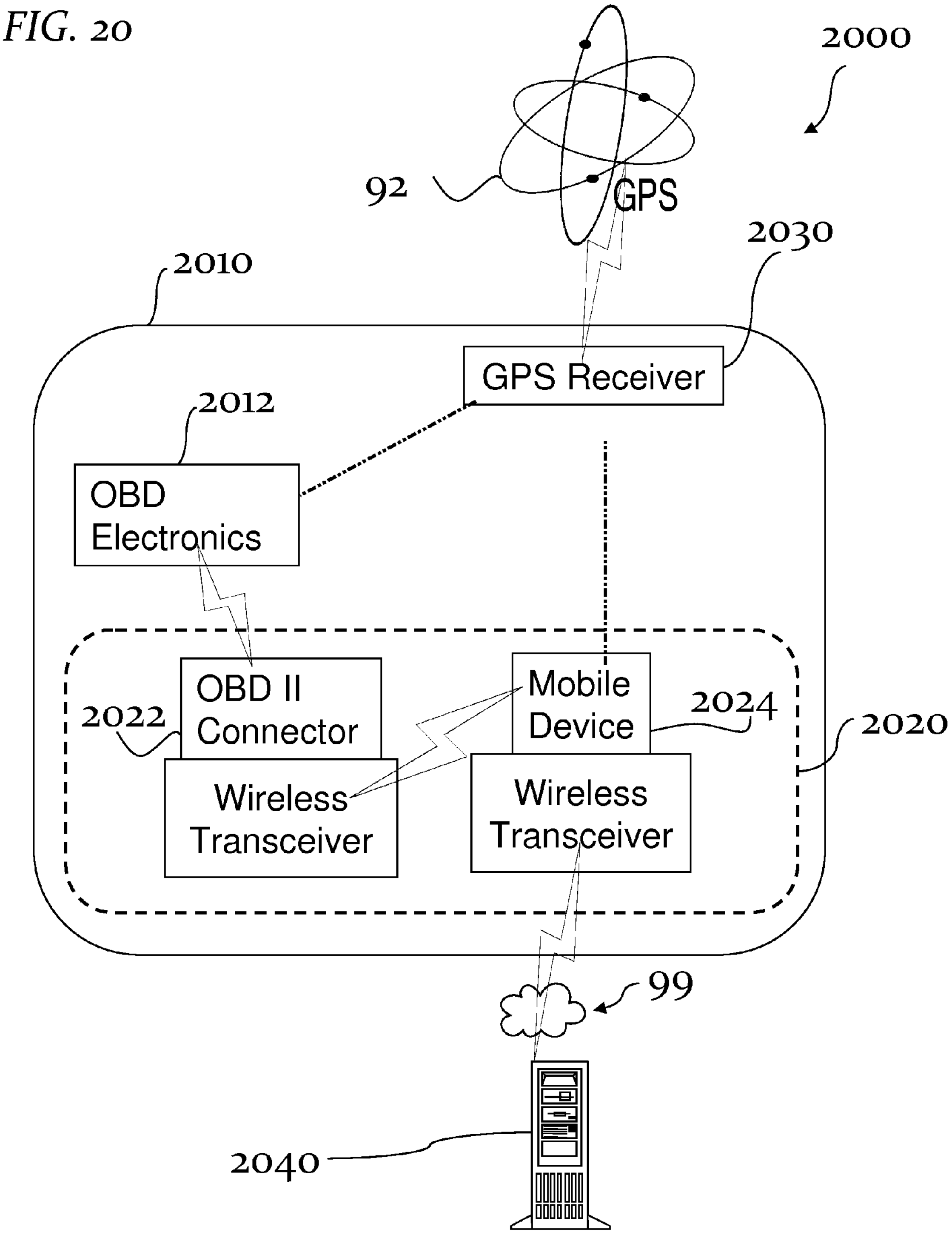
FIG. 20 is a block diagram of a computerized telematics system 2000, according to some embodiments of the invention.

FIG. 20 is a block diagram of a computerized telematics system 2000, according to some embodiments of the invention. In some embodiments, system 2000 is used for the system shown in FIG. 1. In some embodiments, GPS unit 2030 is implemented as part of vehicle 2010, while in other embodiments, GPS unit 2030 is a stand-alone unit or is part of a separate electronics device such as mobile communications device 2024 (e.g., a smartphone, tablet computer, laptop computer or the like). GPS unit 2030 receives signals from GPS satellites 92 and determines a geographic location of vehicle at successive times as needed. In some embodiments, a wireless transceiver 2022 having an OBD-II connector receives vehicle diagnostics data, VIN information and the like from OBD electronics 2012, and passes this data via wireless (or, in other embodiments, wired) transmissions to mobile telecommunications device 2024.

In some embodiments, the telematics sender system 2020 is manufactured as part of, and integrated with, the vehicle 2010, and mobile telecommunications device 2024 is not configured to be separated from vehicle 2010. In some such embodiments, telematics sender system 2020 shares various parts and functions with other communications systems such as crash-detection communicators (e.g., such as OnStar® or the like). In some embodiments, telecommunications device 2024 secures the collected data, anonymizes it, and transmits it across wireless and/or wired networks (such as the phone system and the internet) to one or more centralized servers 2040. The data received by server 2040 is aggregated and statistical analysis is optionally performed on the data. The user can then log into an internet site to access the user's own data and an aggregation of that data with data from other users as a reference or comparison set of data, that takes into account, make and model of the car, speeds traveled, locations, hills, weather, and the like.

Summary.

This disclosure has identified a number of methods and systems for improving the security of telematics data collected from a vehicle.

In some embodiments, the present invention provides a secured telematics-collection method for monitoring a vehicle with a vehicle computer device located in the vehicle. In some embodiments, this first method includes (a) acquiring vehicle data that includes numerical diagnostic data, time data, and location data associated with the route the vehicle travels; (b) associating said numerical diagnostic data with said time data and said location data; (c) securing said vehicle data while stored on said in-vehicle computer; (d) processing said vehicle data according to a mathematical algorithm to generate derived diagnostic and location information that is at least in part derived from the acquired vehicle diagnostic data, time data, and location data, and wherein the derived information has a meaning distinct from the acquired vehicle data; (e) formatting the derived diagnostic or location information for display on an application running on a host computer device, wherein the application can provide an interface for presenting information associated with the vehicle, wherein the interface includes at least one of an icon and a data field associated with derived information indicative of the vehicle's engine performance; and (f) wirelessly transmitting said formatted vehicle data in a communication to host computer device.

In some embodiments of the secured telematics-collection method, the vehicle computer delays the transmission of vehicle data to the host computer for a user configured length of time.

In some embodiments of the secured telematics-collection method, the application includes a browser.

In some embodiments of the secured telematics-collection method, the application includes methods for statistical analysis.

In some embodiments of the secured telematics-collection method, the vehicle diagnostic data includes at least one of the following numerical parameters: engine RPM, engine intake manifold air pressure, engine mass air flow measurement, engine coolant temperature, ambient air temperature, engine intake air temperature, vehicle VIN, vehicle mileage, vehicle speed as reported by the OBD.

In some embodiments of the secured telematics-collection method, the vehicle computer changes the VIN to make the particular vehicle anonymous while retaining information in the VIN which identifies the make and model of the vehicle.

In some embodiments of the secured telematics-collection method, the vehicle diagnostic data is broken by intervals of travel and which includes interval location start and end data, start and end time data, minima and maxima of vehicle diagnostic data associated with the vehicle between the start and end location, averages and deciles or other statistical measures of vehicle diagnostic data associated with the vehicle between the start and end location.

In some embodiments of the secured telematics-collection method, the vehicle uses a geometric algorithm to determine the start and end locations of each interval of travel based on a user preference.

In some embodiments of the secured telematics-collection method, the vehicle uses a topological algorithm to determine the start and end locations of each interval of travel based on a user preference.

In some embodiments of the secured telematics-collection method, the vehicle computer encrypts vehicle data before transmitting to the host computer so that the host computer can decrypt the data using a key known to the host computer.

In some embodiments of the secured telematics-collection method, the vehicle computer does not capture data to permanent storage until a certain distance from the start or to the end point has been identified.

In some embodiments of the secured telematics-collection method, upon user action, the vehicle computer removes stored vehicle diagnostic data and encryption keys, and requests that the host computer also destroy its keys.

In some embodiments, the present invention provides an anonymized data-collection method for monitoring a vehicle with a vehicle computer device located in the vehicle. This second method includes: (a) determining the VIN of the vehicle; (b) changing the VIN to make the particular vehicle anonymous while retaining information in the VIN which identifies the make and model of the vehicle; (c) wirelessly transmitting to a host computer the anonymous VIN of the said vehicle; and (d) wirelessly receiving from a host computer a table of OBD queries to determine if any abnormal measurements exist for this particular make and model of vehicle.

In some embodiments of the anonymized data-collection method, the queries include a warning message and severity of each query if the query identifies a problem with the vehicle.

In some embodiments of the anonymized data-collection method, the queries include a set of OBD parameters to be requested and recorded to the vehicle computer if the query identifies a problem with the vehicle.

In some embodiments of the anonymized data-collection method, the queries include a frequency of execution for each query.

In some embodiments, the present invention provides a vehicle computer device configured to be located in a vehicle. The vehicle computer device is also configured to (a) acquire vehicle data comprising numerical diagnostic data, time data, and location data associated with the route the vehicle travels; (b) associate the numerical diagnostic data with the time data and the location data; (c) secure the vehicle data while stored on the in-vehicle computer; (d) process the vehicle data according to a mathematical algorithm to generate derived diagnostic and location information that is, at least in part, derived from the acquired vehicle diagnostic data, time data, and location data, and wherein the derived information has a meaning distinct from the acquired vehicle data; (e) format the derived diagnostic or location information for display from an application running on a host computer device, wherein the application provides an interface for presenting information associated with the vehicle, wherein the interface includes at least one of an icon and a data field associated with derived information indicative of the vehicle's engine performance; and (f) wirelessly transmit the formatted vehicle data in a communication to host computer device.

In some embodiments, the vehicle computer device delays the transmission of vehicle data to the host computer for a user-configured length of time.

In some embodiments, the application includes a browser.

In some embodiments, the application includes methods for statistical analysis.

In some embodiments, the vehicle diagnostic data includes at least one of the following numerical parameters: engine RPM, engine intake manifold air pressure, engine mass air flow measurement, engine coolant temperature, ambient air temperature, engine intake air temperature, vehicle VIN, vehicle mileage, vehicle speed as reported by the OBD.

In some embodiments, the vehicle computer device changes the VIN to make the particular vehicle anonymous while retaining information in the VIN which identifies the make and model of the vehicle.

In some embodiments, the vehicle diagnostic data is broken by intervals of travel and which includes interval location start and end data, start and end time data, minima and maxima of vehicle diagnostic data associated with the vehicle between the start and end location, averages and deciles or other statistical measures of vehicle diagnostic data associated with the vehicle between the start and end location.

In some embodiments, the vehicle computer device uses a geometric algorithm to determine the start and end locations of each interval of travel based on a user preference.

In some embodiments, the vehicle computer device uses a topological algorithm to determine the start and end locations of each interval of travel based on a user preference.

In some embodiments, the vehicle computer device encrypts vehicle data before transmitting to the host computer so that the host computer can decrypt the data using a key known to the host computer.

In some embodiments, the vehicle computer device does not capture data to permanent storage until a certain distance from the start or to the end point has been identified.

In some embodiments, upon user action, the vehicle computer device removes stored vehicle diagnostic data and encryption keys, and requests that the host computer also destroy its keys.

In some embodiments, the present invention provides a vehicle computer device, located in a particular vehicle, configured to perform a method. This method includes (a) determining the VIN of the vehicle; (b) changing the VIN to make the particular vehicle anonymous while retaining information in the VIN which identifies the make and model of the vehicle; (c) wirelessly transmitting to a host computer the anonymous VIN of the said vehicle; and (d) wirelessly receiving from a host computer a table of OBD queries to determine if any abnormal measurements exist for this particular make and model of vehicle.

In some embodiments of the vehicle computer device, the queries include a warning message and severity of each query if the query identifies a problem with the vehicle.

In some embodiments of the vehicle computer device, the queries include a set of OBD parameters to be requested and recorded to the vehicle computer if the query identifies a problem with the vehicle.

In some embodiments of the vehicle computer device, the queries include a frequency of execution for each query.

In some embodiments, the present invention provides a computerized method for monitoring a particular vehicle with a vehicle computer system located in the vehicle, the monitoring method including: acquiring a set of vehicle data that includes vehicle diagnostic data, time data, and location data associated with a route the vehicle travels; associating each of a plurality of the diagnostic data with respective ones of the time data and the location data; securing the set of vehicle data and then storing the secured set of vehicle on the vehicle computer system; and after a predetermined time delay from the acquiring of the set of vehicle data has elapsed, wirelessly transmitting the set of vehicle data to a host computer server.

In some embodiments, the monitoring method further includes processing the set of vehicle data according to a mathematical algorithm to generate derived diagnostic information that is at least in part derived from the acquired vehicle diagnostic data, time data, and location data, wherein the derived information has a meaning distinct from the acquired set of vehicle data; formatting the derived diagnostic information to obtain formatted derived information for visual display by an application running on a user's computer device, wherein the visual display includes at least portions of the derived information indicative of the vehicle's engine performance; and transmitting the formatted derived information to the user's computer device.

In some embodiments, the monitoring method further includes delaying the wirelessly transmitting of the set of vehicle data to the host computer server for a user-configured time delay after the acquiring of the vehicle data.

In some embodiments of the monitoring method, the acquiring of the set of vehicle data includes acquiring a vehicle identification number (VIN) of the particular vehicle, and the method further includes: before the wirelessly transmitting of the set of vehicle data to the host computer server, changing the VIN to make the particular vehicle anonymous while retaining information from the VIN which identifies a make and model of the particular vehicle.

In some embodiments of the monitoring method, the vehicle diagnostic data includes a plurality of parameters reported by on-board diagnostics (OBD) functions of the vehicle, the parameters selected from the set consisting of: engine RPM, engine intake manifold air pressure, engine mass air flow measurement, engine coolant temperature, ambient air temperature, engine intake air temperature, vehicle identification number (VIN), vehicle mileage, and vehicle speed as reported by the OBD.

In some embodiments of the monitoring method, the set of vehicle data is organized in subsets broken by intervals of travel, wherein each subset includes interval start and end location data, start and end time data, minima and maxima of vehicle diagnostic data associated with the vehicle between the start and end location, averages and deciles of statistical measures of vehicle diagnostic data associated with the vehicle between the start and end location.

In some embodiments, the monitoring method further includes using a geometric algorithm to determine the start and end locations of each interval of travel based on a user-specified parameter.

In some embodiments, the monitoring method further includes using a topological algorithm to determine the start and end locations of each interval of travel based on a user-specified parameter.

In some embodiments, the monitoring method further includes public-key-encrypting vehicle data before transmitting to the host computer server so that the host computer server can decrypt the data using a private key in the host computer.

In some embodiments, the monitoring method further includes capturing data to permanent storage only after determining that a predetermined distance from the start or to the end point has been traveled.

In some embodiments of the monitoring method, upon user action, the vehicle computer removes stored vehicle diagnostic data and encryption keys, and requests that the host computer also destroy its keys.

In some embodiments, the monitoring method further includes displaying the derived information indicative of the vehicle's engine performance via a browser program.

In some embodiments, the monitoring method further includes performing a statistical analysis on the derived information to obtain statistical results, and displaying the statistical results on the host computer device.

In some embodiments, the present invention provides a data structure for organizing a set of vehicle data regarding a particular vehicle, wherein the set of vehicle data includes vehicle diagnostic data, time data, and location data associated with a route the particular vehicle travels. This data structure includes vehicle information derived from the particular vehicle's vehicle identification number (VIN); and a plurality of interval subsets, each interval subset associated with a particular interval of travel, and each interval subset including: data indicative of a start location for the particular interval, data indicative of an end location for the particular interval, data indicative of a start time for the particular interval, data indicative of an end time for the particular interval, data indicative of minima and maxima of a plurality of vehicle diagnostic data associated with the particular vehicle between the start location and the end location for the particular interval, and averages and deciles of a plurality of statistical measures of vehicle diagnostic data associated with the particular vehicle between the start location and the end location for the particular interval.

In some embodiments, the present invention provides a data structure for organizing a set of vehicle data regarding a particular vehicle, wherein the set of vehicle data includes vehicle diagnostic data, time data, and location data associated with a route the particular vehicle travels, the data structure including: vehicle information derived from the particular vehicle's vehicle identification number (VIN); and a plurality of interval subsets, each interval subset associated with a particular interval of travel, and each interval subset including: data indicative of a start location for the particular interval, data indicative of an end location for the particular interval, data indicative of a start time for the particular interval, data indicative of an end time for the particular interval, and data indicative of a plurality of vehicle diagnostic data associated with the particular vehicle between the start location and the end location for the particular interval. In some embodiments of this data structure, each interval subset further includes data indicative of minima and maxima of the plurality of vehicle diagnostic data associated with the particular vehicle between the start location and the end location for the particular interval. In some embodiments of this data structure, each interval subset further includes averages and deciles of a plurality of statistical measures of the plurality of vehicle diagnostic data associated with the particular vehicle between the start location and the end location for the particular interval.

In some embodiments, the present invention provides a computerized method for monitoring a vehicle with a vehicle computer system located in the vehicle, and obtaining, into the vehicle computer system, vehicle-specific queries for the vehicle's make and model while maintaining anonymity of the vehicle. This vehicle-model-specific-but-particular-vehicle-anonymous method includes: determining the VIN of the vehicle; changing the VIN into anonymous VIN data to make the particular vehicle anonymous while retaining information from the VIN that identifies a make and model of the vehicle; wirelessly transmitting, to a host computer from the vehicle computer system, the anonymous VIN data of the vehicle; wirelessly receiving, to the vehicle computer system from the host computer a particular set of on-board-diagnostic (OBD) queries to perform to determine whether any abnormal measurements exist for this particular vehicle's make and model; and executing, by the vehicle computer system, a plurality of queries from the particular set of OBD queries.

Some embodiments of the vehicle-model-specific-but-particular-vehicle-anonymous method further include associating entries in the set of OBD queries with a warning message and severity of each query if the query identifies a problem with the vehicle.

In some embodiments of the vehicle-model-specific-but-particular-vehicle-anonymous method, the queries include a set of OBD parameters to be requested and recorded to the vehicle computer if the query identifies a problem with the vehicle.

In some embodiments of the vehicle-model-specific-but-particular-vehicle-anonymous method, the queries include a frequency of execution for each query.

In some embodiments, the present invention provides a vehicle computer device, located in a vehicle, and configured to perform a method. The method includes: acquiring, into a in-vehicle computer, vehicle data that includes vehicle-diagnostic data, time data, and location data associated with a route that a particular vehicle travels; associating the vehicle-diagnostic data with the time data and the location data; securing the vehicle data while stored on the in-vehicle computer; processing said vehicle data according to a mathematical algorithm to generate derived diagnostic and location information that is at least in part derived from the acquired vehicle-diagnostic data, time data, and location data, and wherein the derived information has a meaning distinct from the acquired vehicle data; formatting the derived diagnostic information for display on an application running on a host computer device, wherein the application can provide an interface for presenting information associated with the vehicle, wherein the interface includes at least one of an icon and a data field associated with derived information indicative of the vehicle's engine performance; and wirelessly transmitting said formatted vehicle data in a communication to host computer device.

In some embodiments, the present invention provides a non-transitory computer-readable medium having instructions stored thereon, wherein the instructions, when executed by a suitably programmed information-processing system, perform a method that includes: acquiring, into a in-vehicle computer, vehicle data that includes vehicle-diagnostic data, time data, and location data associated with a route that a particular vehicle travels; associating the vehicle-diagnostic data with the time data and the location data; securing the vehicle data while stored on the in-vehicle computer; processing said vehicle data according to a mathematical algorithm to generate derived diagnostic and location information that is at least in part derived from the acquired vehicle-diagnostic data, time data, and location data, and wherein the derived information has a meaning distinct from the acquired vehicle data; formatting the derived diagnostic information for display on an application running on a host computer device, wherein the application can provide an interface for presenting information associated with the vehicle, wherein the interface includes at least one of an icon and a data field associated with derived information indicative of the vehicle's engine performance; and wirelessly transmitting said formatted vehicle data in a communication to host computer device.

In some embodiments, the medium further includes instructions to cause the method to further include: delaying the transmission of vehicle data to the host computer for a user configured length of time.

In some embodiments, the application includes a browser, and the medium further includes instructions to cause the method to further include: displaying the formatted derived diagnostic information using the browser.

In some embodiments, the medium further includes instructions to cause the method to further include executing a statistical analysis of the derived diagnostic information.

In some embodiments, the vehicle diagnostic data includes engine RPM, engine intake manifold air pressure, engine mass air flow measurement, engine coolant temperature, ambient air temperature, engine intake air temperature, vehicle identification number (VIN) information, vehicle mileage, and vehicle speed as reported by the OBD.

In some embodiments, the medium further includes instructions to cause the method to further include: generating anonymized VIN information based on the VIN to make the particular vehicle anonymous while retaining information from the VIN that identifies the make and model of the vehicle.

In some embodiments, the vehicle diagnostic data is organized into a plurality of interval subsets defined by intervals of travel, and wherein each interval subset includes interval location start and end data, start and end time data, minima and maxima of vehicle diagnostic data associated with the vehicle between the start and end location, averages and deciles statistical measures of vehicle diagnostic data associated with the vehicle between the start and end location of the respective interval.

In some embodiments, the medium further includes instructions to cause the method to further include: using a geometric algorithm to determine the start and end locations of each interval of travel based on a user preference.

In some embodiments, the medium further includes instructions to cause the method to further include: using a topological algorithm to determine the start and end locations of each interval of travel based on a user preference.

In some embodiments, the medium further includes instructions to cause the method to further include: encrypting vehicle data before transmitting to the host computer so that the host computer can decrypt the data using a key known to the host computer.

In some embodiments, the medium further includes instructions to cause the method to further include: not capturing data to permanent storage until after a certain distance from the start of the route has been traveled; and not keeping data relating to locations closer than a predetermined distance from the end point of the route.

In some embodiments, the medium further includes instructions to cause the method to further include: based upon user action, removing stored vehicle diagnostic data and encryption keys, and requesting that the host computer also destroy its keys.

In some embodiments, the present invention provides a vehicle computer system, located in a particular vehicle. This system includes: a VIN-determination unit that determines a vehicle identification number (VIN) of the vehicle; an anonymizer unit that generates anonymized VIN information based on the VIN that identifies the make and model of the vehicle without identification of the particular vehicle; a wireless transmitter configured to wirelessly transmit, to a host computer server system, the anonymized VIN information of the vehicle; and a wireless receiver configured to wirelessly receive, from the host computer server system, a set of on-board-diagnostic (OBD) queries configured for this particular make and model of vehicle to determine whether any abnormal measurements exist.

In some embodiments of the vehicle computer system, a plurality of the set of OBD queries include a warning message and severity of a problem associated with each query if the query identifies the problem with the vehicle.

In some embodiments of the vehicle computer system, each respective one of the queries include a set of OBD parameters to be requested and recorded to the vehicle computer system if the respective query identifies a problem with the vehicle.

In some embodiments of the vehicle computer system, the set of OBD queries specify a frequency of execution for each query.

Some embodiments of the vehicle computer system further include an interval-recording unit that organizes the set of vehicle data in a plurality of interval subsets, each interval subset associated with a particular interval of travel, and each interval subset including: data indicative of a start location for the particular interval, data indicative of an end location for the particular interval, data indicative of a start time for the particular interval, data indicative of an end time for the particular interval, and data indicative of a plurality of vehicle diagnostic data associated with the particular vehicle between the start location and the end location for the particular interval. In some embodiments, each interval subset further includes: data indicative of minima and maxima of the plurality of vehicle diagnostic data associated with the particular vehicle between the start location and the end location for the particular interval; and a plurality of statistical measures of the plurality of vehicle diagnostic data associated with operation of the particular vehicle between the start location and the end location for the particular interval.

In some embodiments, the vehicle computer system is an integrated part of a vehicle, and the apparatus of the present invention includes the vehicle that the vehicle of which the vehicle computer system is a part, and in which the vehicle computer system is located.

All publications, patents and patent applications cited herein are incorporated herein by reference. While in the foregoing specification this invention has been described in relation to certain embodiments thereof, and many details have been set forth for purposes of illustration, it will be apparent to those skilled in the art that the invention is susceptible to additional embodiments and that certain of the details described herein may be varied considerably without departing from the basic principles of the invention.

The use of the terms "a" and "an" and "the" and similar referents in the context of describing the invention are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A computerized method for monitoring a particular vehicle with a computer system located in the particular vehicle, the computerized method comprising:

acquiring a set of vehicle data from the particular vehicle that includes vehicle diagnostic data, time data, and location data associated with a route the vehicle travels;

associating each of a plurality of diagnostic data with respective ones of the time data and the location data;

analyzing, in the computer system located in the particular vehicle, the set of vehicle data to determine a severity of a warning indication from a set of severities;

outputting to a user, from the computer system located in the particular vehicle, the severity of the warning indication;

securing the set of vehicle data to obtain a secured set of vehicle data and then storing the secured set of vehicle data on the computer system located in the particular vehicle; and after a predetermined time delay from the acquiring of the set of vehicle data has elapsed, wireless transmitting the secured set of vehicle data to a host computer server.

2. The computerized method of claim 1, further comprising:

processing the set of vehicle data according to at least one algorithm to generate derived diagnostic information that is at least in part derived from the acquired vehicle diagnostic data, time data, and location data, wherein the derived information has a meaning distinct from the acquired set of vehicle data, and wherein the at least one algorithm includes at least one selected from the set consisting of a geometric-location algorithm and a topological-location algorithm;

formatting the derived diagnostic information to obtain formatted derived information for visual display by an application running on the computer system, wherein the computer system includes a user's computer device, wherein the visual display includes at least portions of the derived information indicative of the vehicle's engine performance; and transmitting the formatted derived information to the user's computer device.

3. The computerized method of claim 1, wherein the acquiring of the set of vehicle data includes acquiring a vehicle identification number (VIN) of the particular vehicle, the method further comprising:

before the wirelessly transmitting of the set of vehicle data to the host computer server, changing the VIN to make the particular vehicle anonymous while retaining information from the VIN which identifies a make and model of the particular vehicle.

4. The computerized method of claim 1, wherein the vehicle diagnostic data includes a plurality of parameters reported by on-board diagnostics (OBD) functions of the vehicle, the parameters selected from the set consisting of: engine RPM, engine intake manifold air pressure, engine mass air flow measurement, engine coolant temperature, ambient air temperature, engine intake air temperature, vehicle identification number (VIN), vehicle mileage, and vehicle speed as reported by the OBD.

5. The computerized method of claim 4, further comprising:

organizing the set of vehicle data in a plurality of interval subsets, wherein each interval subset includes interval start-location and end-location data, start-time and end-time data, minima and maxima of vehicle diagnostic data associated with the vehicle between the start and end location, averages and deciles of statistical measures of vehicle diagnostic data associated with the vehicle between the start and end location.

6. The computerized method of claim 1, further comprising public-key-encrypting vehicle data before transmitting to the host computer server so that the host computer server can decrypt the data using a private key in the host computer.

7. The computerized method of claim 1, further comprising capturing data to permanent storage only after determining that a predetermined distance has been traveled.

8. The computerized method of claim 1, wherein the computer system located in the particular vehicle includes a smartphone.

9. The computerized method of claim 1, wherein the set of severities includes:

I) information,

II) warning—contact service facility for future service,

III) drive below a specified speed, and drive less than a specified distance to get service, and IV) stop vehicle immediately.

10. A non-transitory computer-readable medium having instructions stored thereon, wherein the instructions, when executed by a suitably programmed information-processing system, perform a method comprising:

acquiring, into a in-vehicle computer located in the vehicle, vehicle data that includes vehicle-diagnostic data, time data, and location data associated with a route that a particular vehicle travels;

associating the vehicle-diagnostic data with the time data and the location data;

securing the vehicle data while stored on the in-vehicle computer;

processing said vehicle data according to at least one algorithm to generate derived diagnostic and location information that is at least in part derived from the acquired vehicle-diagnostic data, time data, and location data, wherein the at least one algorithm includes at least one selected from the set consisting of a geometric-location algorithm and a topological-location algorithm, and wherein the derived information has a meaning distinct from the acquired vehicle data;

analyzing, in the in-vehicle computer located in the vehicle, said vehicle data to determine a severity of a warning indication from a set of severities;

outputting to a user, from the in-vehicle computer located in the vehicle, the severity of the warning indication;

formatting the derived diagnostic information for display on an application running on a user's computer device, wherein the application presents to a user information associated with the vehicle, wherein the interface includes at least one of an icon and a data field associated with the derived information indicative of the vehicle's engine performance; and wireless transmitting said formatted vehicle data in a communication to a host computer device.

11. The non-transitory computer-readable medium of claim 10, further comprising instructions to cause the method to further include:

delaying the transmission of vehicle data to the host computer for a user configured length of time.

12. The non-transitory computer-readable medium of claim 10, wherein the application includes a browser, the non-transitory computer-readable medium further comprising instructions to cause the method to further include:

displaying the formatted derived diagnostic information using the browser.

13. The non-transitory computer-readable medium of claim 10, further comprising instructions to cause the method to further include:

generating anonymized VIN information based on the VIN to make the particular vehicle anonymous while retaining information from the VIN that identifies the make and model of the vehicle.

14. The non-transitory computer-readable medium of claim 10, wherein the vehicle diagnostic data is organized into a plurality of interval subsets defined by intervals of travel, and wherein each interval subset includes interval location start and end data, start and end time data, minima and maxima of vehicle diagnostic data associated with the vehicle between the start and end location, averages and deciles statistical measures of vehicle diagnostic data associated with the vehicle between the start and end location of the respective interval.

15. The non-transitory computer-readable medium of claim 10, further comprising a data structure, stored on the non-transitory computer-readable medium, for organizing a set of vehicle data regarding a particular vehicle, wherein the set of vehicle data includes vehicle diagnostic data, time data, and location data associated with a route the particular vehicle travels, the data structure including:

vehicle information derived from the particular vehicle's vehicle identification number (VIN) that indicates a make and model of the particular vehicle but that does not include a serial number of the particular vehicle; and a plurality of interval subsets, each interval subset associated with a particular interval of travel, and each interval subset including:

data indicative of a start location for the particular interval, data indicative of an end location for the particular interval, data indicative of a start time for the particular interval, data indicative of an end time for the particular interval, and data indicative of a plurality of vehicle diagnostic data associated with the particular vehicle between the start location and the end location for the particular interval.

16. The non-transitory computer-readable medium of claim 15, each one of the plurality of interval subsets further including:

data indicative of minima and maxima of the plurality of vehicle diagnostic data associated with the particular vehicle between the start location and the end location for the particular interval.

17. The non-transitory computer-readable medium of claim 15, each one of the plurality of interval subsets further including:

averages and deciles of a plurality of statistical measures of the plurality of vehicle diagnostic data associated with the particular vehicle between the start location and the end location for the particular interval.

18. The non-transitory computer-readable medium of claim 15, the data structure further including a parameter that specifies a privacy buffer distance associated with each start location and end location.

19. A computerized method for monitoring a particular vehicle with a computer system located in the particular vehicle, the computerized method comprising:

acquiring a set of vehicle data from the particular vehicle that includes vehicle diagnostic data, time data, and location data associated with a route the vehicle travels;

associating each of a plurality of the diagnostic data with respective ones of the time data and the location data;

securing the set of vehicle data and then storing the secured set of vehicle on the computer system located in the particular vehicle;

after a predetermined time delay from the acquiring of the set of vehicle data has elapsed, wirelessly transmitting the secured set of vehicle data to a host computer server;

analyzing, in the computer system located in the particular vehicle, the set of vehicle data to determine a severity of a warning indication from a set of severities;

outputting to a user, from the computer system located in the particular vehicle, the severity of the warning indication;

aggregating, in the host computer server, sets of vehicle data from a plurality of vehicles having similar characteristics to obtain an aggregated performance of the plurality of vehicles having similar characteristics;

comparing performance of the particular vehicle to the aggregated performance of the plurality of vehicles having similar characteristics based on the set of vehicle data from the particular vehicle; and presenting to a user results from the comparing.

* * * * *